Figure 14:
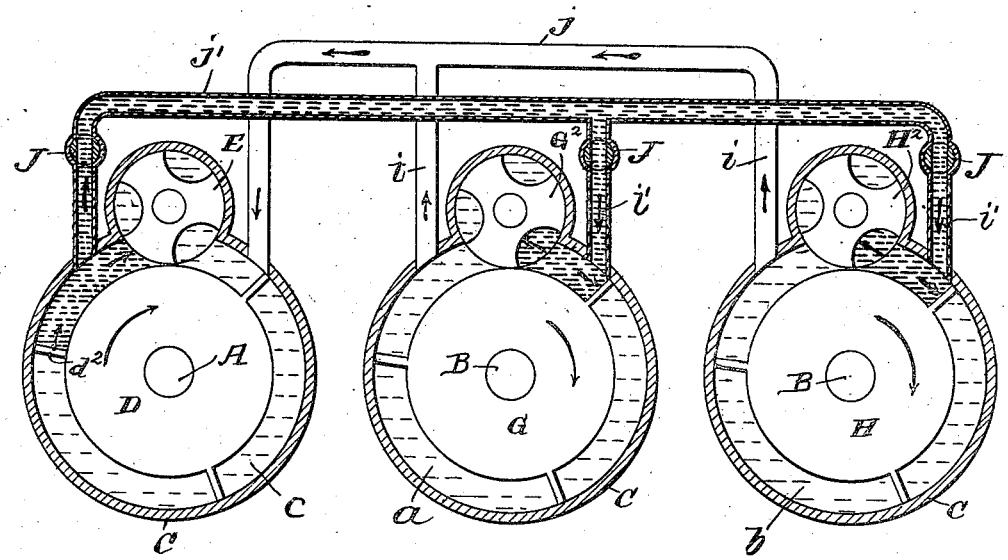

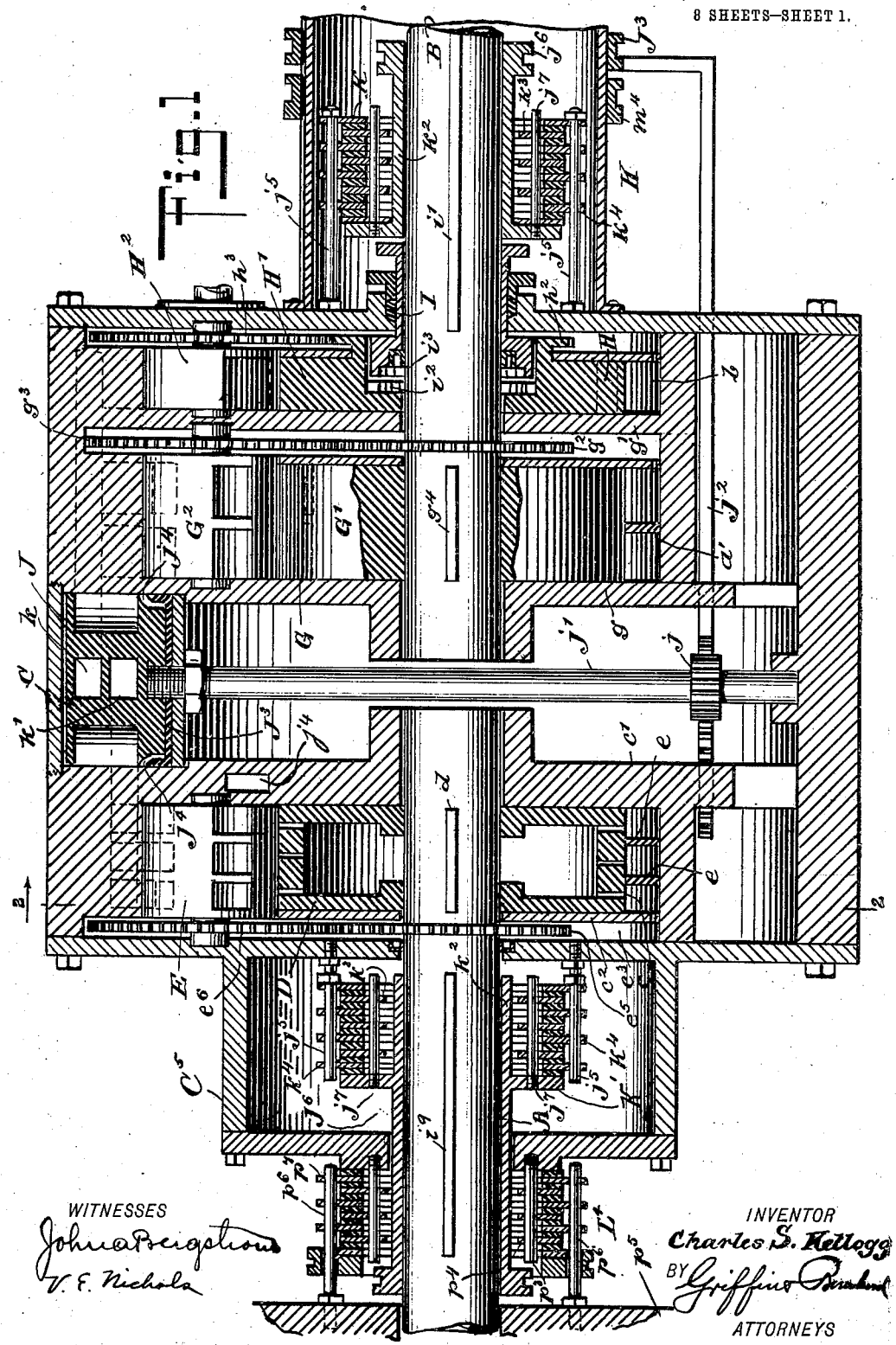

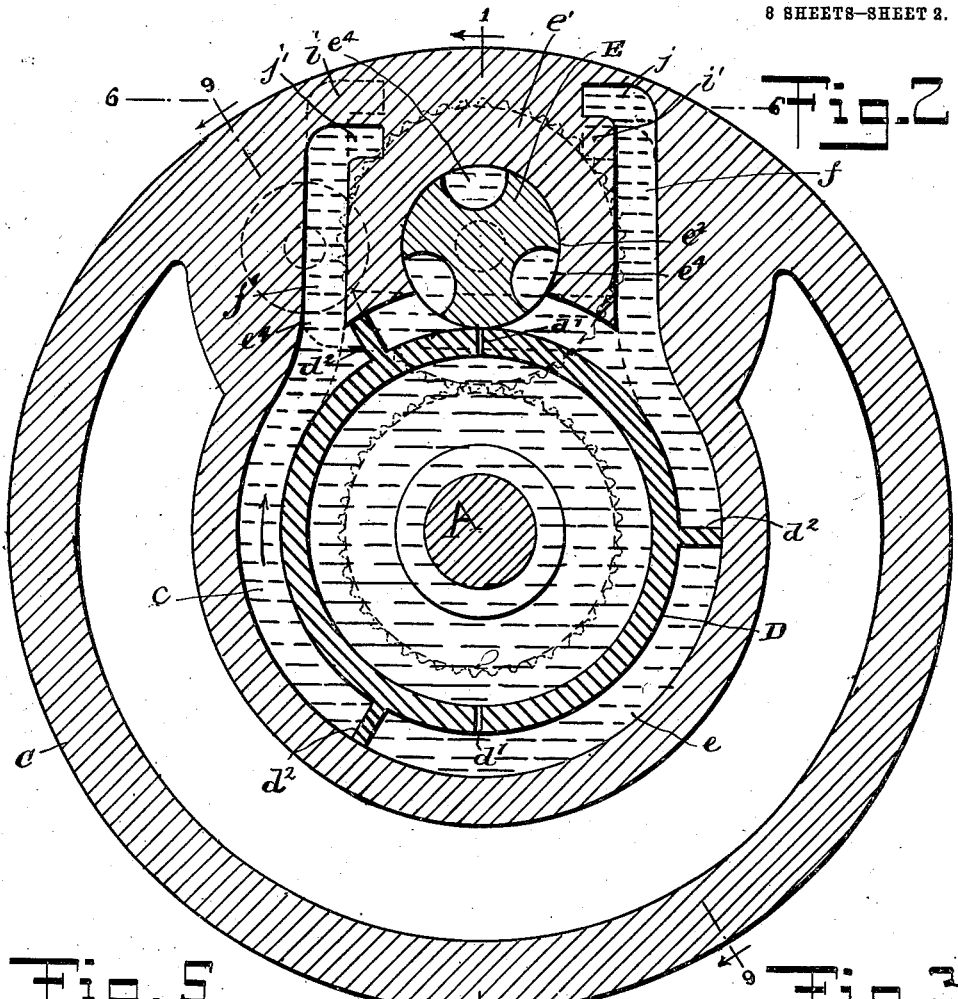
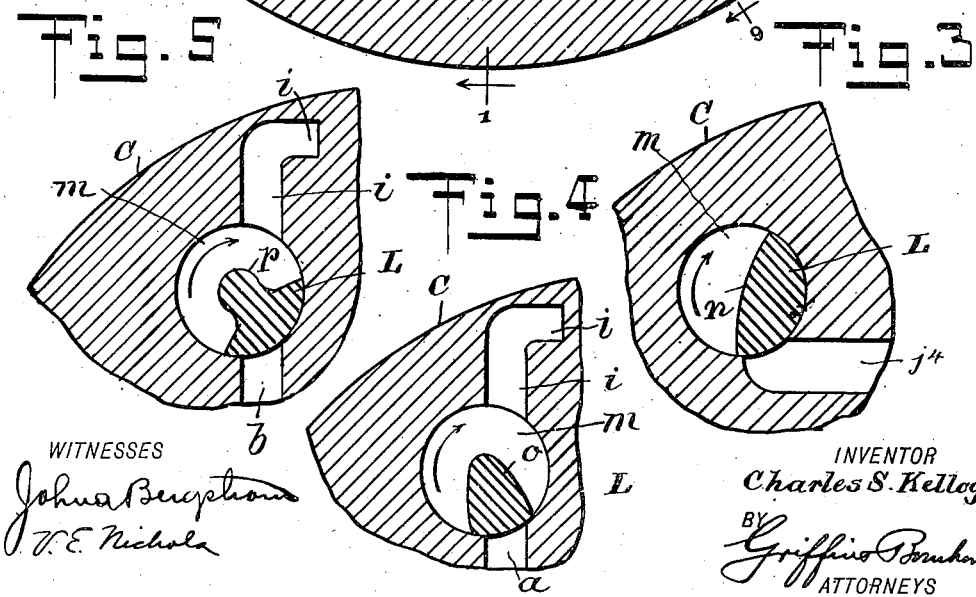

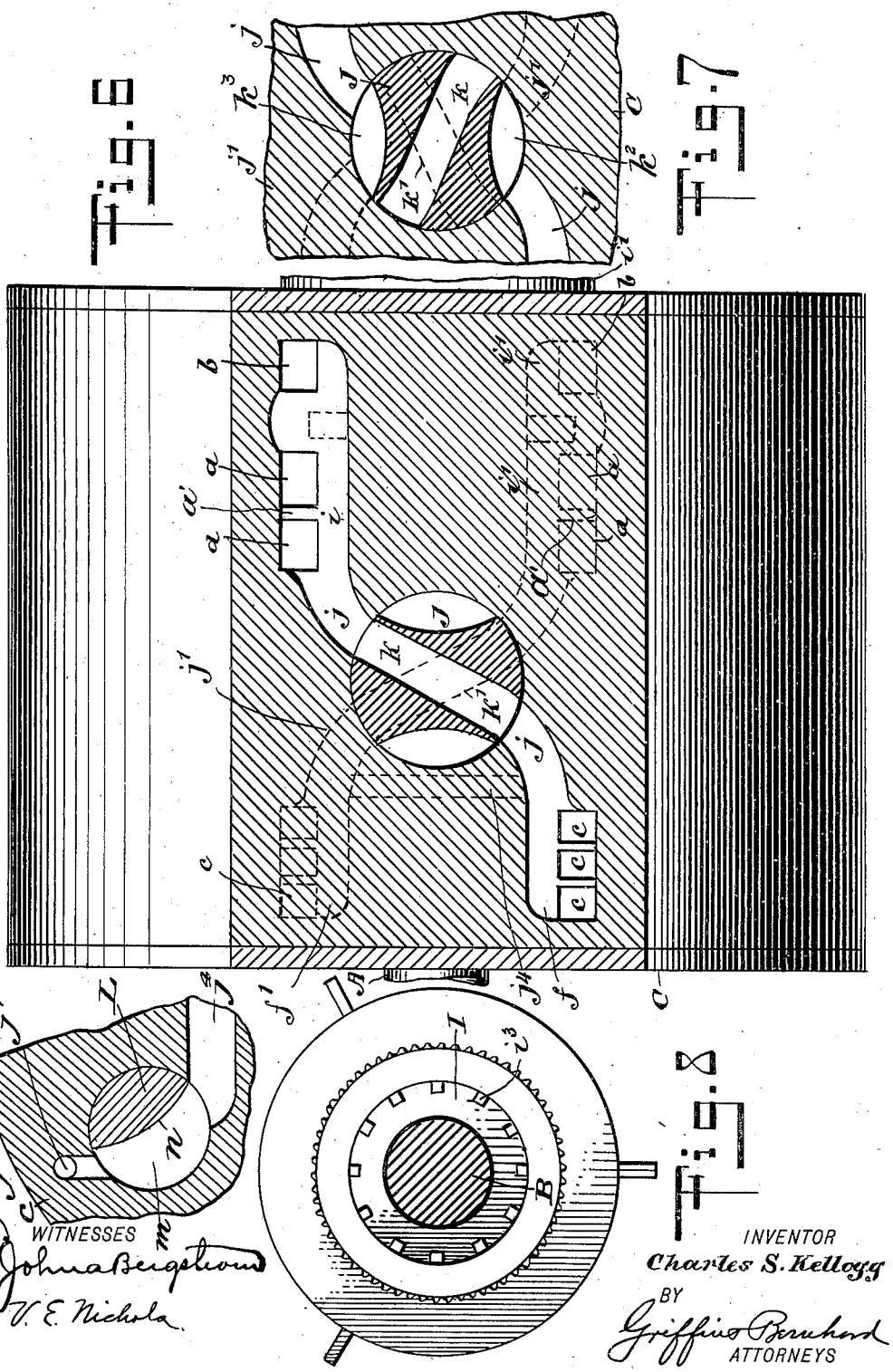

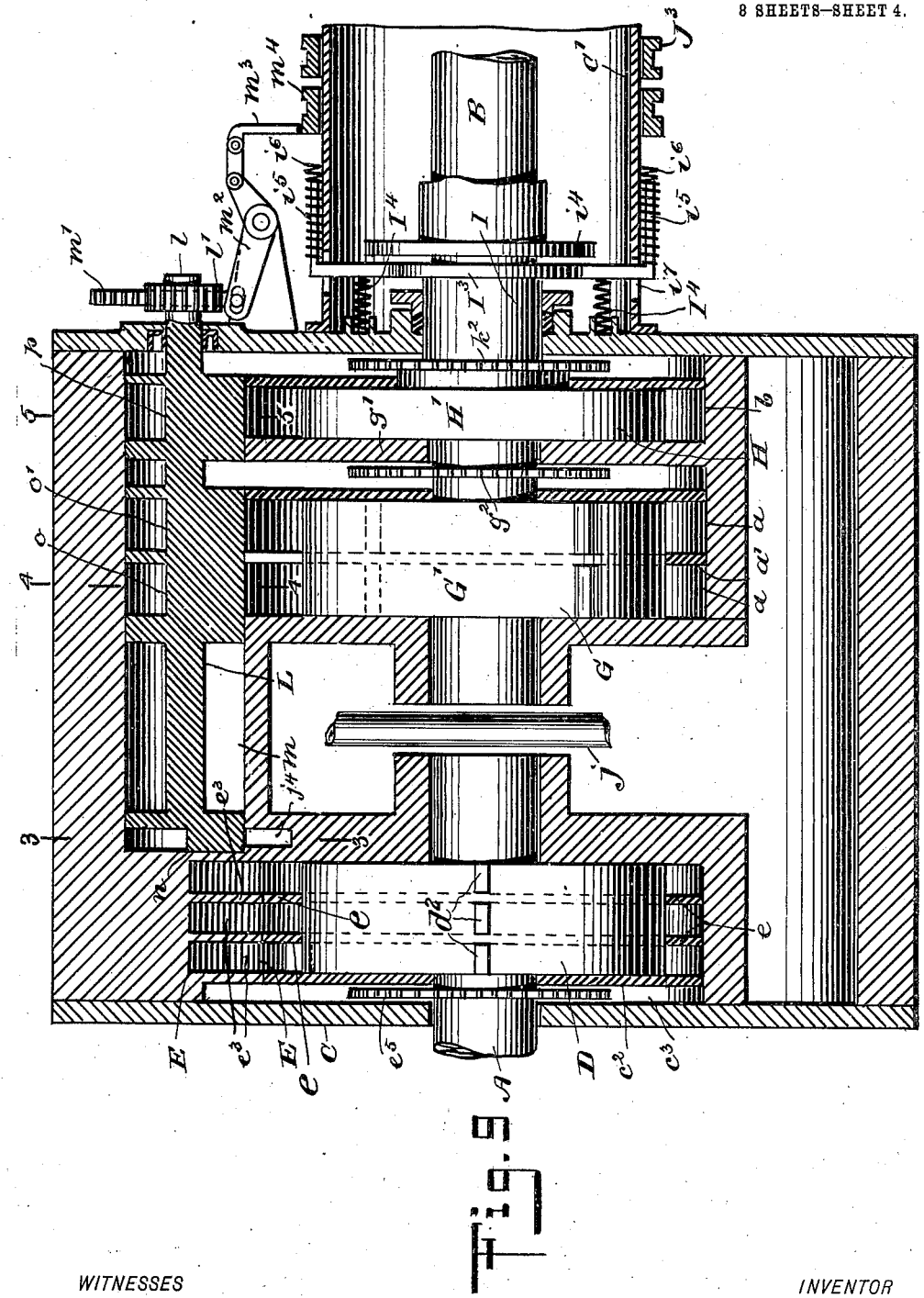

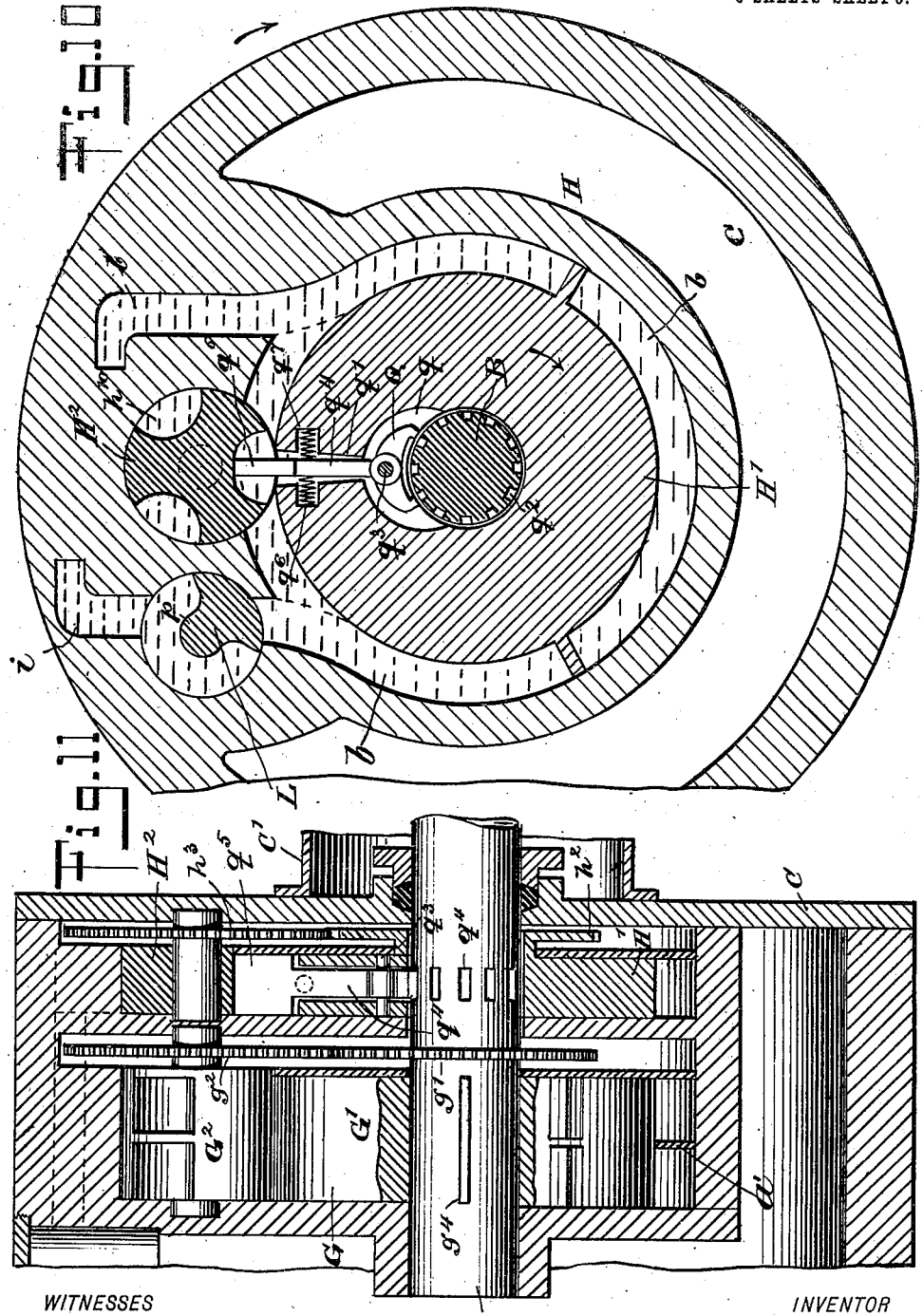

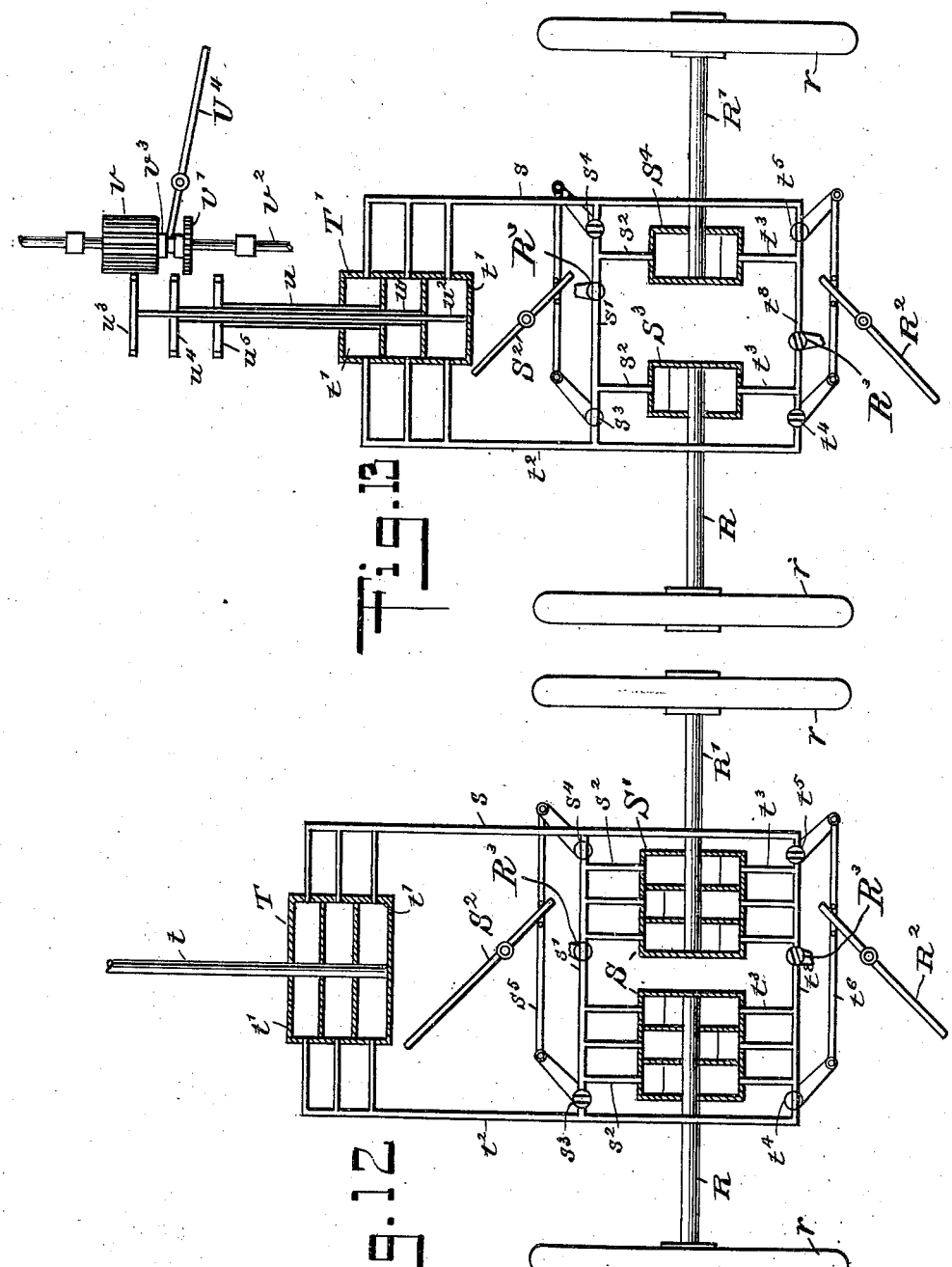

C. S. KELLOGG.
FLUID OPERATED POWER TRANSMISSION MECHANISM.
APPLICATION FILED MAY 24, 1907.

1,080,281.

Patented Dec. 2, 1913.

8 SHEETS—SHEET 7.

WITNESSES

INVENTOR
Charles S. Kellogg
BY
ATTORNEYS

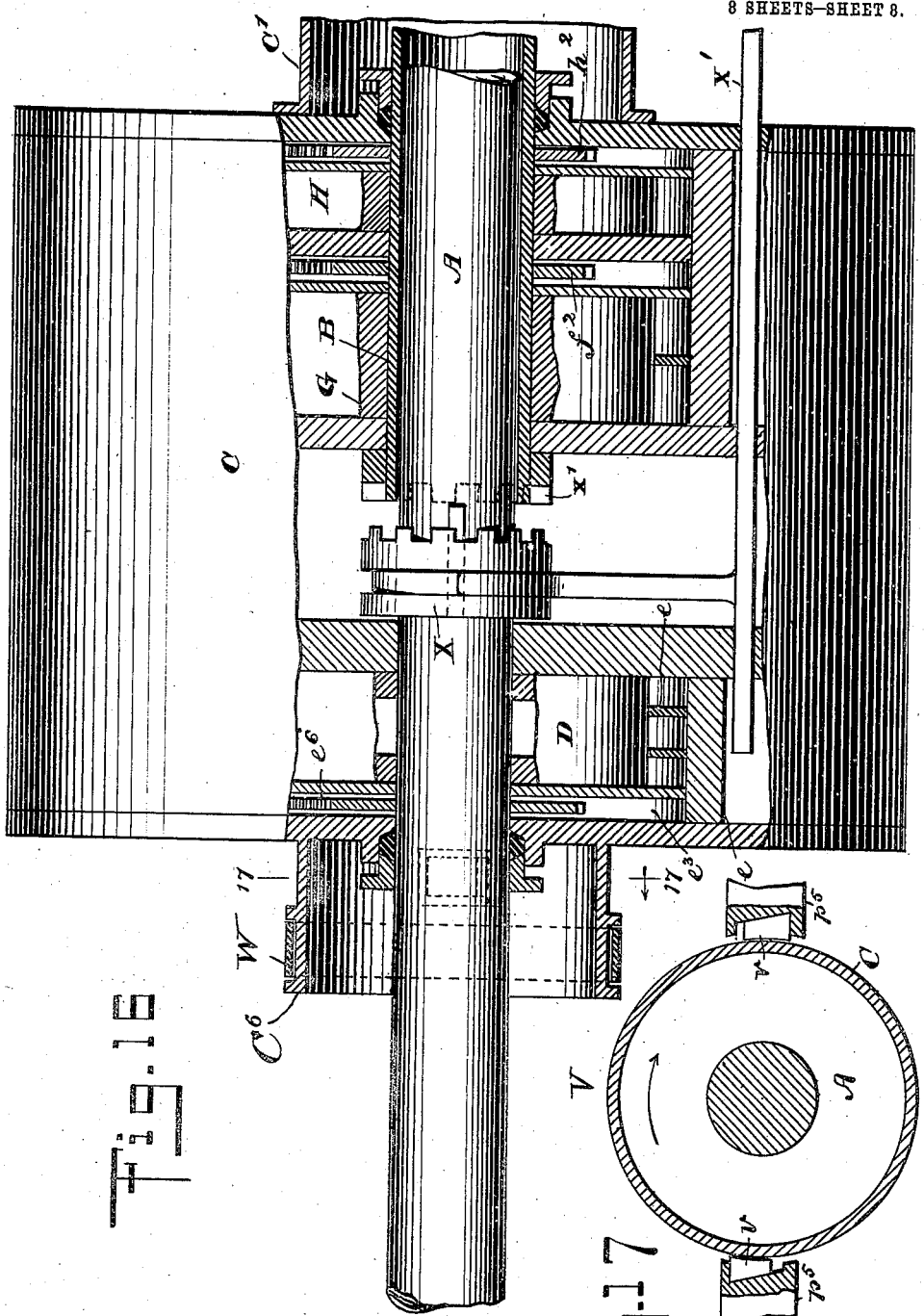

UNITED STATES PATENT OFFICE.

CHARLES SNOW KELLOGG, OF MONTCLAIR, NEW JERSEY.

FLUID-OPERATED POWER-TRANSMISSION MECHANISM.

1,080,281.   Specification of Letters Patent.   Patented Dec. 2, 1913.

Application filed May 24, 1907. Serial No. 375,529.

*To all whom it may concern:*

Be it known that I, CHARLES SNOW KELLOGG, a citizen of the United States, residing in Montclair, in the county of Essex and State of New Jersey, have invented a certain new and useful Fluid-Operated Power-Transmission Mechanism, of which the following is a specification.

The invention is a fluid operated mechanism designed, primarily, for the transmission of power from one shaft or member to another shaft or member. Although said mechanism is especially intended for use in connection with the driving mechanism of automobiles, it is to be understood that it may be employed generally in any and all arts wherein it is desired to communicate motion, and control or regulate the transmission of power, from one member to another.

According to this invention, power is transmitted from one part, such as a shaft, to another part, such as a shaft, by the circulation of a fluid in a closed circuit.

An important and salient feature of the invention consists of means whereby the "torque", or torsional energy, communicated to the driven part is augmented and increased in direct ratio as the speeds of the driving and driven parts. Furthermore, the torque is controllable and variable at will by the simple adjustment of a valve which regulates the circulation of a fluid. It is to be understood, therefore, that the variable control and the power transmitted is dependent almost wholly upon the circulation of a more or less inelastic fluid, which fluid is instantly governed and regulated merely by the adjustment of a suitable valve mechanism, whereby the speed ratio of the driving and driven shafts are made to accord with the ratio of the engine power and the road resistance.

The new mechanism dispenses to a large extent, if not wholly, with the employment of mechanical transmission or speed changing gears, and said mechanism obviates the shock, jar and vibration due to the employment of such gears, more especially when the speed is changed to or from the high, low or intermediate speed gears, which changes in speed are frequently required to meet the road conditions in the practical use of automobiles.

The full power of the engine can be obtained by running it at the speed at which that power is developed and varying the ratio of speed of driven and driving shafts to meet the road conditions.

Another part of the invention consists of means whereby the friction is minimized. In my apparatus, the inclosing casing is mounted for rotation freely with respect to the driving and the driven parts, and consequently the friction of the circulating fluid is materially reduced.

Another, and an important, feature of my invention consists of means whereby the direction of rotation of the driven part may be reversed with relation to the driving part, and, furthermore, the speed of such reversed driven part, and the power thereof, is controllable or regulatable with the same facility as when driving ahead, or in the same direction as the driving part. The capability of the transmission mechanism to reverse the driven part, and to increase the torque of the driven part when operating under such reverse conditions, is an especially useful and meritorious feature of the new transmission mechanism when employed in connection with automobiles, for the reason that in backing the vehicle out of a "rut" in the road, or in backing the vehicle up a steep grade or hill, it is an indispensable requirement, at times, to be able to utilize the maximum power of the apparatus. As indicated, an especially useful feature of the apparatus is the instantaneous control of the driven part when reversed, such advantage being secured by a simple adjustment of a valve mechanism for regulating the volume and pressure of the circulating medium.

Another part of my invention is to utilize the fluid transmission as a brake mechanism for the purpose of retarding or arresting the motion of the driven part by opposing to such driven part a variable fluid resistance, the circulation of which is regulatable at will by adjusting a valve mechanism so as to offer more or less resistance to such driven part, whereby the speed of an automobile when "coasting" or when descending a steep grade can be regulated and controlled.

In the use of the apparatus as a brake mechanism, the rotary casing is held stationary by an appropriate form of brake mechanism, whereas the engine is free to run with the power shut off.

Another part of my apparatus consists of means for mechanically coupling the driven and driving parts fast one to the other, whereby the transmission mechanism when incapacitated from service by leakage of the fluid, or from other causes, cannot preclude the operator from running the vehicle under its own power, in which case the mechanism operates as a mechanical clutch between the said driving and driven parts, in order that an automobile may be enabled to return from the road to a garage without appreciable loss of time and to operate in all respects as though the mechanism were not a part of the automobile.

Although my apparatus, from one standpoint, is a variable-power fluid-transmission for automobiles and other machinery, the principle of the invention is available in the construction of a differential gear for automobiles. It is to be understood, therefore, that it is intended to apply such principle to the differential gearing used in connection with a divided driving axle, each member of which has a motor connected with a fluid pump by a closed fluid circulating system adapted to supply the fluid to such motors, and thereafter return the fluid back to said pump. Suitable provision is made for controlling the direction of flow of the fluid in order that the motors may be propelled forward or backward, as circumstances require, and, further, provision is made for operating one motor with greater power than the other motor, in order to dislodge one of the vehicle wheels from a rut in the road.

The foregoing is a brief statement of the nature and objects of the invention, without defining or limiting the scope thereof, but many purposes and advantages of the invention, other than those enumerated, will be apparent from the following description.

In the accompanying drawings, I have illustrated various practical embodiments of the invention, but the constructions shown therein are to be understood as illustrative only, and not as defining the limits of said invention.

Figure 15:
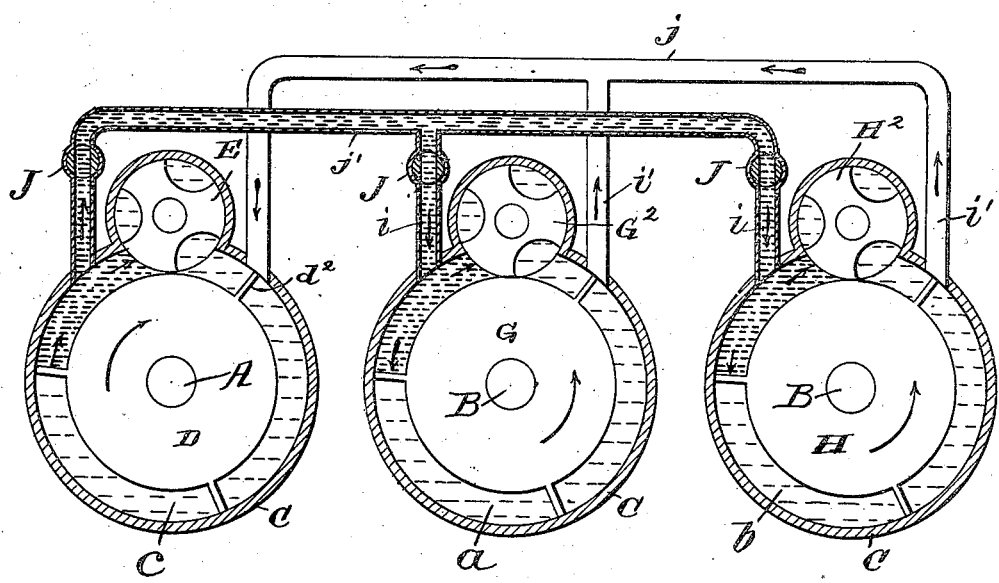

Figure 1 is a vertical longitudinal section through a fluid operated transmission mechanism constructed in accordance with this invention, the plane of the section being indicated by the dotted line 1—1 of Fig. 2. Fig. 2 is a vertical cross section through the apparatus on the line 2—2 of Fig. 1 looking in the direction of the arrow, said figure showing one form of rotary pump consisting of a driving element which operates to force fluid into a plurality of motors, the latter operating the driven element. Figs. 3, 4, and 5 are detail sectional views on the lines 3—3, 4—4, and 5—5 respectively, of Fig. 9 showing the different construction of a controlling valve which operates to regulate the circulation of a fluid from the pump mechanism to the plurality of motors, whereby two or more of said motors may be brought into service, or the motors may be operated separately, the said valve serving the further purpose of regulating the volume of the fluid which is pumped by the driving mechanism to the motors. Fig. $3^a$ is a view similar to Fig. 3 showing valve L adjusted for its section $n$ to open by-pass $j^4$ in order that liquid may flow out of and back into the pump chamber $c$. Fig. 6 is a horizontal section through a part of the transmission mechanism, taken in the plane of the dotted line 6—6 of Fig. 2. Fig. 7 is a detail view showing a reversing valve adjusted to an opposite position to that in which said valve is shown in Fig. 6. Fig. 8 is a detail cross section illustrating one embodiment of means whereby a normally loose or idle motor member may be made fast with the driven shaft when it is desired to bring the idle motor into operative relation to said shaft for the purpose of increasing the power of the transmission mechanism and consequently secure increased torque on the driven element. Fig. 9 is a vertical longitudinal section through the apparatus taken in the plane of the dotted line 9—9 of Fig. 2 looking in the direction of the arrow and showing certain parts in elevation. Figs. 10 and 11 are vertical sections taken in planes at right angles one to the other illustrating another embodiment of means adapted to make the idle motor fast with the driven shaft, said means being operated in one direction or the other according as the motive fluid is pumped in one direction or the other. Figs. 12 and 13 are diagrammatic views illustrating the application of my invention to the differential gearing employed in automobiles. Figs. 14 and 15 are diagrammatic views of the fluid driving mechanism illustrating the course of circulation of the fluid when propelling direct and in reverse. Fig. 16 is a section partly in elevation showing a preferred form of the driving mechanism. Fig. 17 is a detail section on the line 17—17 of Fig. 16.

For the purpose of explaining my invention I will describe the same as it is adapted to be used in connection with the parts of an automobile, but as hereinbefore stated it is to be understood that I do not limit the invention to use in this particular art.

A designates the driving element or member and B the driven element or member, said element or member, A, being in the present instance a shaft adapted to be propelled by a motor or engine, and the element or member, B, a shaft from which power is taken for propelling an automobile. As shown, the shafts, A, B, are in the same horizontal plane, in alinement one with the other, the adjacent ends of the shafts being separated, but it is not intended to limit the invention to shafts of the particular form in Figs. 1 and 9 for the reason that one shaft may be tubular and arranged to incase a part of the other shaft, as in Fig. 16, whereby the two shafts are fitted telescopically together in order that they may reinforce one another and be arranged in compact order.

C designates a casing which forms one of the working parts of the apparatus and incloses other working parts of the apparatus. Said casing fits over or houses the adjacent or overlapping ends of the driving and driven shafts, A, B, respectively. This casing is constructed interiorly to provide a number of chambers, one of which forms a chamber for the piston member of a rotary pump, while other chambers receive the rotary pistons of certain fluid operated motors, and still other chambers accommodate a valve or valves for controlling the circulation between the pump and the motor or motors of a fluid which is forced by the pump mechanism into one or more of said motors for operating the latter and consequently communicating motion and power to the driven shaft, B. As shown in Figs. 1 and 9, the casing, C, is provided with a partition $c'$, which forms an interior chamber, $c$, the latter being a pump chamber for the fluid adapted to be forced through the apparatus by the operation of the piston, D, the latter being keyed as at $d$ on the shaft, A, or made fast therewith in a suitable way. The pump chamber, $c$, is formed by a part of the casing, C, and the interior divisions or walls, $c'$, $c^2$, the latter forming a sub-chamber $c^3$, adapted to contain suitable gearing for operating an abutment, E, which coöperates with the pump piston, D. Said piston is shown in the drawings as consisting of a hollow cylinder with flat ends adapted to serve as a reservoir for the storage of the fluid to be forced by the pump through the casing, C, and into one or more motors, but it will be understood that it is not intended to limit the invention to a form of rotary pump wherein the piston, D, is concentric with the shaft, A, and which necessarily employs a rotatable abutment, E, in connection with said concentric piston, for the reason that I reserve the right to substitute a rotary eccentric piston pump in lieu of the concentric piston pump shown in the present exemplification of the invention. The piston, D, is provided with a plurality of radial ports, $d'$, for permitting the motive fluid to be drawn or forced by centrifugal energy from the reservoir chamber into the pump chamber, $c$. The aforesaid pump chamber, $c$, in the casing, C, is, furthermore, subdivided into a plurality of fluid-containing compartments by the employment of one or more partitions, $e$, spaced in said chamber, $c$, between the side walls, $c'$, $c^2$, thereof, as clearly shown in Figs. 1 and 9. The partitions $e$, are parallel to each other and the walls, $c'$, $c^2$, and they embrace the piston, D, said partitions fitting snugly to the annular wall of the divided pump-chamber, $c$, and said partitions also fitting snugly to the rotatable abutment, E. Said piston, D, is provided with groups of wings or vanes, $d^2$. The wings or vanes of each group extend radially from the piston, and each group operates in one of the sub-compartments of the divided pump chamber, $c$. In the construction shown in Figs. 1, 2, and 9, the pump chamber, $c$, is divided by two partitions, $e$, $e$, into three sub-compartments, and each group of wings on the piston, D, comprises three vanes, hence the piston, D, should be provided with three groups of vanes, one group for each sub-compartment of the chamber, $c$, each group consisting of three wings. It is to be understood, however, that the number of sub-compartments in the pump chamber, the number of groups of vanes on the piston, and the number of vanes in each group, are not material, so that these parts may be modified or changed by the skilled constructor.

According to this invention a suitable pumping mechanism, of one type or other, is operated directly or indirectly from the engine shaft, the latter running usually at a uniform rate of speed. Said pump forces a fluid from the chamber, $c$, of the casing, C, into and through certain passages which are provided in said casing, C, said passages forming in said casing an element or part which, for convenience and brevity, is termed in this specification a closed fluid circuit. As shown in Figs. 2, 6, and 9, the casing, C, is provided with chambers, $f$, $f'$, which are positioned at opposite sides of abutment, E, and open directly into the respective ends of pump chambers, $c$. With these chambers, $f$, $f'$, communicates one end portion of passages, $j$, $j'$, see Fig. 6, and these passages, $j$, $j'$, are, on one side of valves, J, L, connected by by-pass, $j^x$, see Figs. 1, 3, and 6, all as will hereinafter appear. One branch of said fluid circuit, or in other words, one of the passages, such as $j$ in Figs. 6 and 7, establishes communication through chamber, $f$, in Fig. 6 with the divided pump chamber, $c$, and with a motor chamber, or a plurality of motor chambers, $a$, $a$, $b$; said passage or branch, $j$, communicating at one end with the annular divided chamber, $c$, on or at one side thereof, and also communicating, at its other end, with the motor chamber or chambers, see Fig. 6. The other branch of the aforesaid fluid circuit is in the form of a passage, $j'$, see Figs. 6 and 7, which branch or passage $j'$, is in communication, also, with the divided annular pump chamber, $c$, and with the motor chamber or chambers, $a$, $a$, $b$. It is to be noted, first, that one end of the branch or passage, $j'$, connects with the pump chamber, $c$, on the opposite side thereof from the branch or passage, $j$, while the other end of the branch or passage, $j'$, communicates with the motor chamber or chambers, $a$, $a$, $b$, on the opposite side thereof from the branch or passage, $j$; and, second, that the branches or passages, $j$, $j'$, are in crossing relation to each other in the wall of the casing, C, whereby the crossing passages or branches intersect in such manner that a single valve, such as J (Figs. 6 and 7), may be used in controlling the direction of the fluid, or reversing the direction of flow of the fluid, as may be desired. Under one condition of service, the passage or branch, $j$, and the valve, J, when adjusted to the position of Fig. 6, enables the fluid to pass from one side of the pump chamber, $c$, through the passage, $j'$, one port, $k'$, of the valve, J, to and into one or more of the motor chambers, $a$, $a$, $b$, thence in one direction through said motor chamber or chambers, thence into the other branch or passage, $j$, through another port, $k$, in the valve, J, and thence back to the pump chamber, $c$, the return of the fluid being on the opposite side of the pump from that side of which the fluid is forced out by the action of the pump piston. The fluid is thus forced, under velocity and pressure dependent upon the speed and power of the pump, from a pump chamber to one or more motor chambers, through a closed circuit which conveys the fluid from, and returns it back to, the pump chamber; and the fluid is thus adapted to act on one or more motors for driving the same during the circulation of the fluid through said motor chamber or chambers. The reversing valve, J, may, however, be adjusted to change the course or direction of circulation of the fluid, for the purpose of driving the motor or motors in an opposite direction to that just described, but under such conditions of reverse drive of the motor or motors, the pump continues to operate in the same direction as before, for the reason that the engine drives the pump constantly in one direction. As shown in Figs. 6 and 7, the reversing valve, J, is provided, in addition to the ports, $k$, $k'$, with the surface ports, $k^2$, $k^3$, which are so positioned on said valve as to establish communication of the passages, $j$, $j'$, with each other and through the valve when said valve is adjusted to the position of Fig. 7. Assuming that the pump is operating to force liquid from the upper part of the pump chamber, $c$, in Fig. 6, and the valve, J, is adjusted to the position of Fig. 7, the fluid passes through a part of the passage, $j'$, thence to and through the surface port, $k^3$, of the valve, J, thence to a part of the passage, $j$, thence into the upper side of the motor chamber or chambers, $a$, $a$, $b$, thence through said motor chamber or chambers in an opposite direction to the passage of the fluid, as first described, thence to and through passage, $i'$, into and through the other surface port, $k^2$, of the valve, J, and thence through the remaining part of the passage, $j$, back to the pump chamber, $c$. As stated, the fluid leaves, and is returned to, the pump chamber in the same manner under both adjustments of the reversing valve, J, but with the valve, J, adjusted to the position of Fig. 6, the fluid passes from right to left clockwise through the motor chamber or chambers, $a$, $a$, $b$, so as to drive the motor or motors clockwise, while an adjustment of the valve, J, to the position of Fig. 7, causes the fluid to circulate from left to right counter clockwise in the motor chamber or chambers so as to drive the motor or motors in an opposite direction, or counter clockwise.

At one side of the pump chamber, which is of the circular form shown in Fig. 2, the casing, C, is formed with a solid wall indicated at $e'$ in said Fig. 2, and the casing is provided, furthermore, with liquid chambers, $f$, $f'$, situated on opposite sides of the wall, $e'$, and having communication directly with the sub-chambers or compartments of the pump chamber, $c$. The wall, $e'$, is formed with a substantially circular opening, $e^2$, the inner surface of which provides a seat for the rotatable abutment, E, the latter being in the plane of the piston, D, and disposed in contact therewith for the purpose of coöperating with said piston in forcing the fluid to circulate through the apparatus.

As shown in Fig. 9, the abutment, E, passes through the partitions, $e$, $e$, and said abutment coöperates with the peripheral surface of the piston, D, see Figs. 1, 2, and 9. Said abutment is provided at intervals corresponding with the wings, $d^2$, of the pump piston with recesses or pockets, $e^4$, the latter being constructed and located to receive said wings when the latter come opposite to the abutment, whereby clearance spaces are provided in the abutment for the passage of the piston wings at each rotation of the piston. It is preferred to rotate the abutment, E, positively, and to attain this result suitable gears, $e^5$, $e^6$, are arranged in the compartment, $c^3$, of the pump, said gear, $e^5$, being made fast with the driving shaft, A, while gear, $e^6$, is secured to the shaft of the abutment, E, whereby said abutment is rotated by motion transmitted from said shaft, A.

As shown in Figs. 1 and 9, the casing, C, is divided interiorly by partitions, $g$, $g'$, to form other chambers, $a$, $b$, respectively, the chamber, $a$, being of larger capacity than the chamber, $b$, and said chambers receiving the parts constituting a duplex rotary motor, G, and an idle rotary motor, H, the latter being a reserve motor adapted to be brought into operation when it is desired to increase the power or torque exerted by said motors upon the driven element or shaft, B.

The motor, G, operates in the chamber, a, and it consists of a rotary piston, G', and the rotatable abutment, G². The piston, G', is provided with suitable wings adapted to enter suitable clearance pockets in the abutment in the manner described in connection with the pump and as is well known to those skilled in the art. In this connection it is desired to state, however, that the motor, G, is of a double or duplex construction, and the capacity of said motor is in excess of the capacity of the pump. As shown, the abutment, G², is driven from the shaft, B, by suitable gears, $g^2$, $g^3$. The idle or reserve motor, H, consists of a piston, H', and an abutment, H², which are substantially the same in construction as the motor, G, but it is to be noted that although the pistons, G', H', of the motors, G, H, respectively, are mounted on the driven shaft, B, said piston, G', is made fast with the shaft, as for example by a key, $g^4$, whereas the piston, H', of the reserve or idle motor is mounted loosely on said shaft, B.

The motor chamber, a, is divided by partitions, a', into a number of compartments and this motor chamber communicates with fluid chambers, i, i', which are similar to the fluid chambers, f, f', of the pump, said fluid chambers, i, i', also communicating with the chamber, b, of the idle motor, H, as shown in Fig. 6. The fluid chamber, f, of the pump is adapted to communicate with the fluid chamber, i, leading to the motor chambers, a, b, by the branch or passage, j, of the fluid circuit heretofore described, and in like manner the fluid chambers, f', i', are adapted to communicate with each other by the branch or passage, j', said fluid passages, j, j', crossing each other and forming the aforesaid liquid circuit in one embodiment of the invention.

The reversing valve, J, shown in Figs. 1, 6, and 7 of the drawings, is carried by a shaft, J', arranged transversely within the casing, C, and mounted in suitable bearings therein, see Fig. 1. Said shaft, J', is controllable at will by means of a train of devices adapted to be set into operation either by the hand or foot of the operator, and as shown, said shaft is provided with a gear pinion, j, with which is adapted to intermesh the teeth on a slidable rack bar, J², said rack bar extending beyond the casing and connected with an operating collar, J³. It will be understood that when the collar is moved in one direction the shaft, J', and the valve, J, are adjusted so that the valve will move to the position shown in Fig. 6, whereby the liquid is adapted to circulate from one side of the pump to the other side of the motor or motors. The valve, however, may be adjusted to a reverse position, shown in Fig. 7, for establishing communication between the passages, j, j', and chambers, f, f', and i, i', in such manner that the liquid may be forced from the same side of the pump to the opposite side of the motor or motors from that first described, for the purpose of driving said motor or motors in an opposite direction, thus reversing the direction of flow through the motor or motors of the liquid under pressure from the pump, and driving the motor or motors in a backward direction.

Any suitable kind of reversing valve, J, may be employed, but in the drawings I have shown one form of valve provided with two reversely arranged interior ports, $k$, $k'$, and with the surface ports, $k^2$, $k^3$. The ports, $k$, $k'$, extend through the valve, and are disposed one above the other, or at different distances from the axis of the shafts, A, B, see Fig. 1. The port, $k$, in the valve is adapted to register with the two parts, j, j, of one liquid passage, see Fig. 6, whereas the other port, $k'$, is in a plane to register with the two parts, j', of the other liquid passage between the pump and the motor. This construction of the valve provides for the circulation of a column of fluid impelled by the action of a pump to one side of the motor or motors, and for the return of the fluid from the motor back to the other side of the pump. This is true of the valve in either of its adjusted positions for the reason that the ports, $k$, $k'$, direct the circulation of the fluid in one direction through the motor or motors for the purpose of driving the same forward, whereas the ports, $k^2$, $k^3$, direct the fluid, when the valve is reversed, through the motor or motors in an opposite direction so as to drive said motor or motors in a reverse direction.

As the reversing valve, J, is at the intersection of the passages, j, j', it is important to construct said valve to overcome the leakage of the fluid under pressure. This result is accomplished, in the form of valve shown in Fig. 1, by the employment of a hydraulic packing, $j^3$, the latter having a lip which engages the valve seat, the liquid under pressure being admitted to said lip by ports, $j^4$, in a manner well understood.

It is well known to those skilled in the art that the internal combustion engines, commonly employed on automobiles, are driven at all times in one direction, and when my transmission mechanism is used between the driving and driven shafts of an automobile, the shaft, A, is rotated by the engine constantly in one direction.

The shaft, B, from which power is transmitted to the motor vehicle or other apparatus, is adapted to be driven in one direction or the other by the action of the fluid which is forced through the liquid circuit by the operation of pump, D. The reversing valve, J, however, controls the direction of the circulation of the liquid, so that when the valve is in the position of Fig. 6, the motor or motors are driven in the same direction as the pump, and consequently in the same direction as shaft, A, and the engine; but when said valve, J, is reversed to occupy the position of Fig. 7, the direction of flow of the liquid is reversed through the circuit, and the motor or motors, so that said motor or motors are driven in an opposite direction to the pump, the shaft, A, and the engine, thereby providing means for moving the vehicle in a backward direction.

In addition to valve, J, for controlling the direction of flow of the liquid so as to drive the motor or motors in the same direction as, or in an opposite direction to, the pump, another valve, L, is employed, which valve regulates the flow of fluid from the pump to the motor or motors, G, H. The valve may be adjusted to preclude the liquid from passing to either motor and to open the by-pass, $j^4$, so that the liquid will circulate from one side of pump, D, to the other side of the pump, or said valve, L, may be adjusted to admit the fluid forced by the pump to the duplex motor, G, or it may be further adjusted to admit the liquid simultaneously to both motor, G, and motor, H. One embodiment of said regulating valve is shown in Figs. 3, 4, 5, and 9 of the drawings, the position of said valve being indicated in dotted lines in Fig. 2 of said drawings.

Regulating valve, L, is separate from reversing valve, J; it is supported in rotary casing, C, at one side of the reversing valve, and means are employed for operating said valve, L, independently of valve shaft, J', and the described devices for operating reversing valve, J.

Casing, C, is provided with a longitudinal valve chamber, m, the same being shown in longitudinal section in Fig. 9, in cross section in Figs. 3, 4, 5, and 10, and in dotted lines in Fig. 2, said valve chamber, m, being circular in cross section. This valve chamber, m, is at one side of reversing valve, J, one end portion of the valve chamber being adapted to communicate with the pump chamber through the interposed fluid chamber, f' (see Fig. 2), said valve chamber extending crosswise of motors, G, H, whereby the valve chamber is adapted for communication, also, with either or both motor chambers, a, b, preferably on that side of said chambers, a, b, into which the fluid is delivered by the passages, j and i.

Valve, L, extends lengthwise of chamber, m, and casing, C, see Fig. 9. Said valve is, at certain parts of its length, cut away transversely, as shown in said Fig. 9, and the valve is thus provided at points intermediate its ends with a plurality of members indicated by n, o, o', and p, said members being of different cross sectional shapes, as shown in Figs. 3, 4, 5, and 10; the valve, L, being otherwise circular in cross section so as to conform to the cross sectional shape of chamber, m, whereby the valve is seated in contact with the walls of said chamber, m, for the purpose of turning easily therein. Sections, n, o, o' and p, of valve, L, provide curved faces which differ in area, as shown in said Figs. 3, 4, 5, and 10; the area of the curved face on section, p, being greater than the area of the surfaces on the sections, o, o', whereas the area of the surface on the section, n, exceeds that of either of the sections, p, o or o, individually considered. These several sections of valve, L, are adapted to control the flow of liquid into the several chambers as follows:—section, p, travels over the port to motor chamber, b, so as to establish or shut off communication between chambers, m, i, and b, see Figs. 5, 9, and 10; sections, o, o', coöperate with the ports of motor chambers, a, a, and chamber, i, so as to open or close communication from chambers, i, m, to motor chambers, a, a, see Figs. 4 and 9, whereas section, n, operates across by-pass $j^4$, see Fig. 3$^a$, for closing and opening the communication between the return or ingoing side of pump chamber c, and the valve chamber, m, and also to open and close the by-pass, $j^4$.

With valve, L, adjusted in the position shown in the drawings, liquid from the pump cannot circulate through the chambers of either motor, G, H, for the reason that sections, o, o', and p, of valve, L, close the ports leading to motor chambers, a, a, b, but section, n, of said valve opens by-pass, $j^4$, so that liquid acted upon by the pump piston will flow from the outgoing branch of passage, j', into the ingoing branch of passage, j, whereby the liquid is free to circulate out of and back into the pump chamber. Under these conditions, the pump exerts no power on the apparatus, or on the driven member, and the liquid circulates merely through the pump chamber.

Should it be desired to operate motor, G, to the exclusion of motor, H (valve, J, being in the position of Fig. 6), valve, L, is turned on its axis a short distance so as to move sections, o, o', of said valve in a direction to permit liquid to circulate through said motor chambers, a, a, and when valve, L, is turned, its section, n, closes the by-pass, sections, o, o', beginning to open the passage for the circulation of liquid through motor chambers, a, a, just prior to the closing of by-pass, $j^4$, thus avoiding a bursting pressure in casing, C. It will be understood that with valve, J, adjusted as in Fig. 6, the liquid upon leaving chamber, f', passes through valve, J, on its way to the motor chambers and thereafter flows through valve, L, on its way back to the pump. To bring motor, H, as well as motor, G, into service, valve, L, is turned to a further position, whereupon sections, o, o', will permit liquid to flow through motor chambers, a, a, as before, and section, p, of the valve opens motor chamber, b, for the admission of liquid to motor, H, whereby motors, G, H, are operated simultaneously by the liquid circulated in casing, C, by the action of the pump. In either of the described positions of valve, L, for controlling motor, G, or motors, G, H, the liquid passes through valve, J, then through the motors, and through valve, L, on its way back to the pump. From this description it is apparent that valve, L, performs important functions. When the valve is adjusted to open the chambers of motors, G, H, driven member, B, is propelled at the slowest speed; but owing to the facts that both motors, G, H, are exposed to the action of the liquid circulated by the pump and that both motors coöperate with the driven member, the greatest power is applied to the driven member, thus securing increased torque on the driven member, the same being at times very desirable. By adjusting valve, L, to shut off the circulation of liquid through the chamber of motor, H, all the liquid is compelled to circulate in motor, G, and thus the speed of motor, G, and the driven element is increased. When valve, L, is further adjusted to shut off liquid from both motors and from the by-pass, the liquid is locked or confined in the casing, C, and thus the casing and motors are caused to rotate with the pump and the driving member, whereby the driving member and the driven member are coupled for unitary rotation by the rotatable casing of the liquid transmission. This coupling of the driving and driven members for unitary rotation may be, and preferably is, accomplished by direct mechanical connections between said members, as will be hereinafter described.

Under some conditions of service, casing, C, is free or unrestrained so that it will be rotated in the same direction as the pump and the engine shaft owing to the pressure of the liquid circulated in the casing. As will hereinafter appear, I associate with this rotating part or casing, C, means, such as an automatic dog to restrain the casing from rotating in a backward direction, and employ, also, additional means, such as a band brake, for locking or restraining the rotary part or casing, C, from rotation in either direction. With the casing, C, locked as described, and the pump acting to circulate the liquid through the casing, the mechanism acts to reverse the motor, although this result may be obtained, also, by the reversing valve hereinbefore described.

It is manifest that valve, L, may be rotated more or less for the two-fold purpose of controlling the by-pass, $j^4$, and of admitting liquid into motor chambers, a, a, or into motor chambers, a, a and b; further, that said valve, L, may be turned to regulate the volume of liquid adapted to pass from pump, D, into one or both motor chambers, a, a and b; and, further, that reversing valve, J, may at any time be operated independently of valve, L, for the purpose of changing the direction of flow of the liquid through motor chambers a, a, b, should it become necessary or desirable to drive the motor or motors in a reverse direction to the rotation of the pump.

Suitable means are provided for rotating valve, L, and as shown in Fig. 9, said valve is provided with a stem, l, the latter protruding from casing, C. Said protruding part of valve stem, l, has a gear pinion, l', with which meshes a rack, $m'$, the latter being connected to a bell crank lever, $m^2$, to one arm of which is pivoted a link, $m^3$, the latter being in turn connected to a slidable collar, $m^4$. It will be understood that when collar, $m^4$, is moved in one direction, bell crank lever, $m^2$, and rack, $m'$, are operated to turn the pinion and said valve, L, to different positions, whereby the valve may be adjusted to control the flow of liquid from the pump to the motor, or said valve may be operated to shut off circulation of the liquid through the motors and establish the flow of liquid through the by-pass, $j^4$.

The piston, H', of the reserve or idle motor, H, is shown in Figs. 1 and 9 as mounted loosely on the driven shaft, B, and as this motor is controllable manually so as to be brought into service under certain conditions in the operation of the transmission mechanism, such as when driving the vehicle in a backward direction, suitable means must be provided for making the piston, H', of said reserve motor fast with the driven shaft. One means for accomplishing this result consists in the employment of a clutch mechanism, herein shown in the form of a sleeve, I, which is splined by a feather, i', on said shaft, B. The piston, H', is chambered and provided in said chambered portion with a clutch face, $i^2$, with which is adapted to engage a clutch face, $i^3$, on the inner end portion of the clutch sleeve, I. It is evident that by sliding the clutch sleeve in an inward direction the face, $i^3$, of said sleeve is adapted to engage with the face, $i^2$, of the motor piston, H', thereby making said piston fast with the shaft, B. The clutch sleeve is adapted to be operated by suitable means, and in Fig. 9 of the drawings I have shown one embodiment of means adapted for operation by the collar, $m^4$, so that when the valve, L, is opened to admit the motive fluid to the chamber, $b$, of the reserve motor the clutch sleeve, I, will be operated simultaneously to make the motor piston, H', fast with the driven shaft, B. A yoke, $I^3$, is movable with clutch sleeve, I, and this yoke, $I^3$, is provided with arms, $i^5$, which are in the path of the slidable collar, $m^4$, said arms, $i^5$, of the yoke being provided with coiled springs, $i^6$, the latter being in the path of said collar, $m^4$.

The casing, C, is shown in Figs. 1 and 9 as being provided at its righthand end portion with a housing, C', said housing being cylindrical. The housing, C', is of less diameter than the casing, and it is provided with slots, $i^7$, through which pass the end portions of the yoke, $I^3$. Said housing, C', serves as a support, also, for the sliding collars, $J^3$ and $m^4$.

The yoke, $I^3$, is shown in Fig. 9 as being pressed normally in one direction by springs, $I^4$, which are seated against the end of head of the casing, C, and these springs, $I^4$, tend to force yoke, $I^3$, and sleeve, I, in an outward direction for disengaging clutch face, $i^3$, of the sleeve from the piston, H', whereby the latter is adapted to be uncoupled from driven shaft, B, and to remain idle with respect thereto.

The means for making fast the motor piston, H', with the driven shaft are operated by the means for adjusting the regulating valve, L, in such manner that when said valve, L, opens the motor chamber, $b$, for the admission of liquid to motor, H, the clutch devices are immediately thereafter, or simultaneously therewith, operated to clutch the piston, H', fast to the driven shaft or member, B. Now, it will be recalled that valve, L, is operated by movement of the collar, $m^4$, toward casing, C, so that a certain travel of said collar will take place without the collar, $m^4$, engaging with springs, $i^6$, or the arms, $i^5$, of the yoke, $I^3$, whereby valve, L, may be rotated for a certain distance to open motor chambers, $a, a$, without affecting the yoke, $I^3$. A further movement of collar, $m^4$, sufficient to further rotate valve, L, and open chamber, $b$, of reserve motor, H, brings collar, $m^4$, into engagement with springs, $i^6$, compressing them, and operating the yoke, $I^3$, said yoke being thus caused to actuate clutch sleeve, I, whereby said clutch sleeve is pressed inwardly and engaged with piston, H', for making the latter fast with shaft, B. It will thus be seen that sleeve, I, operates to clutch piston, H', to the driven shaft immediately after valve, L, opens the motor chamber, $b$, and when said valve, L, is turned in an opposite direction for closing said chamber, $b$, the withdrawal of collar, $m^4$, from springs, $i^6$, permits springs, $I^4$, to act in moving sleeve, I, in an outward direction, thereby disconnecting piston, H', from shaft, B.

The piston, H', of the reserve motor is provided with a gear element, $h^2$, which loosely surrounds the clutch sleeve, I, and with this gear element, $h^2$, meshes a gear, $h^3$, that is fast with the abutment, $H^2$, of the reserve motor, H, whereby said abutment, $H^2$, is rotated in unison with the piston, H', of the reserve motor when the latter is brought into operation by the adjustment of the clutch, I, and the final opening movement given to the member, $p$, of the controlling valve, L.

From the foregoing description it will be recalled that the case, C, is loose or idle with respect to both the driving shaft, A, and the driven shaft, B, for the purpose of minimizing the friction of the current of liquid which circulates in the liquid circuit and operates the motor or motors for the transmission of power from the shaft, A, to the shaft, B; but under certain conditions, as on direct drive, it is advisable to provide means whereby the shafts, A, B, may be coupled for rotation as a unit. For example, should the motive fluid escape by leakage from the case, C, to such an extent as to impair the efficiency, or render inoperative, the transmission mechanism, I employ means whereby the case, C, may be coupled rigidly to the driving and driven shafts, A, B, respectively, whereby an automobile is enabled to return to its starting place, or continue on its journey, under its own motive power. In one embodiment of this part of the invention, case, C, is adapted to be coupled to shafts, A, B, by clutches, K, K', shown in Fig. 1 of the drawings. As shown in Fig. 1, the clutches are of the "multiple disk" type, and each clutch is provided with a sleeve, $k^2$, which is feathered or splined on the shaft, the sleeve of the clutch, K, being connected to the driven shaft, B, by the feather, $i'$, whereas the sleeve, $k^2$, for the clutch, K', is connected to the driving shaft by a feather, $i^9$. The sleeve of each clutch, K, K', is provided with a grooved collar, $j^3$, adapted for the reception of a suitable operating lever in a well known manner, and each sleeve is, furthermore, provided with a plurality of rods, $j^7$, which carry a plurality of disks, $k^3$, the latter alternating with other disks, $k^4$, which are threaded on rods, $j^5$, said rods being fastened to an end of the case, C.

It is evident that the collars, $j^6$, of the clutches K, K', may be operated in order that the disks, $k^3$, $k^4$, of said clutches may be brought into engagement, whereby the clutches operate to make the case, C, fast with the driving and driven shafts, A, B, thus throwing out of operation the pump, D, and the motors, G, H.

In connection with the transmission mechanism I contemplate the provision of means whereby the fluid is adapted to offer resistance to the rotation of the driven element so as to constitute a variable power brake for retarding or arresting the motion of the vehicle on which the transmission mechanism is employed, particularly when descending grades, hills, etc. The mechanism is adapted to serve as a brake by the employment of means for holding the rotatable case, C, at rest and allowing the driven shaft, B, to rotate freely when the vehicle is going down grade, and under these conditions the fluid is adapted to be forced by the motor or motors back to the pump, D, the piston of which pump and the shaft, A, are free to rotate, the power of the engine being shut off whereby the fluid is adapted to circulate through the casing, C. The means shown in Fig. 1 of the drawings for converting the transmission mechanism into a variable power fluid brake is a suitable brake, $L^4$, supported on a stationary element of an automobile, such as the frame indicated at $p^5$. Said brake may be similar to the well known multiple disk clutch, which is shown as having rods, $p^3$, fixed to an element, $C^5$, of the casing, C, and on these rods are the disks, $p^4$, which alternate with other disks, $p^7$, the latter being supported on rods, $p^6$, which are fastened to the frame member, $p^5$, see Fig. 1. A simple form of brake is shown in Fig. 16 as consisting of a band brake, W, adapted to embrace a member, $C^6$, of the casing, C. Said band brake, W, of Fig. 16 is intended to be mounted on a part of the machine frame, and it is adapted to be operated by the hand or foot of the chauffeur, whereby either form of brake can be tightened for the purpose of locking the casing, C, in a stationary position. It will be understood that when the shaft, B, is rotated by the motion of the vehicle when descending a grade, and when the brake, $L^4$ or W, is operated to clamp the casing, C, in a stationary position with respect to the frame, the motor pistons, G', H', will rotate with the shaft, B, and force the fluid through the closed liquid circuit and the pump, D, whereby the liquid is forced to circulate in a way to oppose the rotation of the shaft, B. The speed of rotation of the motors and the speed of the circulation of the fluid is regulated by the adjustment of the governing valve, L, thus opposing variable resistance to the rotation of the shaft, B, whereby the automobile is placed under control of the chauffeur when "coasting." It is evident that the power of the engine should, under these conditions of service, be shut off, but the engine may run idly.

The transmission mechanism shown mainly in Figs. 1 and 9, contemplates the employment of an idle or reserve motor which is mounted loosely on the driven shaft, B, and is adapted to be made fast therewith by the operation of a clutch, such as I; but such clutch is thrown into and out of engagement with the motor piston by devices intended to be operated by the hand or foot of the chauffeur. I consider it preferable, however, to employ means adapted for actuation by the circulating motive fluid in order to automatically couple the piston of said idle or reserve motor to the shaft, B, on the admission of the motive fluid to said motor. One embodiment of means for securing such automatic coupling of the reserve motor piston to the shaft, B, is shown in Figs. 10 and 11 of the drawings.

The motor piston, H', is shown as having a chamber, $q$, around the shaft, B, and with this chamber communicates a radial chamber, $q'$, the latter opening outwardly through the periphery of said piston, H'. In said chamber, $q$, is a double acting clutch, Q, shown in the form of a pawl provided with teeth at its respective ends, and in the shaft, B, is formed an annular series of radial pockets, $q^2$, adapted to serve the purpose of teeth with which the teeth of the double acting clutch are adapted to engage according to the position of said clutch. The clutch is represented as being mounted movably in the chamber, $q$, by a pivot, $q^3$, and said clutch is provided, also, with a radial member, $q^4$, which extends outwardly through the radial chamber, $q'$. The outer portion of this member is enlarged to form a piston, $q^5$, which is arranged to work or travel in the chamber, $b$, of the reserve motor, whereby said piston is exposed to the pressure of the motive fluid so that it will hold the clutch in one position or the other according to the direction in which the fluid is caused to circulate through the chamber, $b$.

Suitable means are employed for holding the radial member, $q^4$, in a position wherein the clutch will be idle and free from engagement with the shaft, B, said means being shown in Fig. 10 as coiled springs, $q^6$, $q^7$, arranged to engage with the respective sides of the member; said springs being seated in suitable pockets of the motor piston, H'. The abutment, $H^2$, which coöperates with the motor piston, H', is provided with pockets, $h^{10}$, adapted to accommodate the piston, $q^5$, so as to provide for the clearance of said abutment, $H^2$, by the piston. It will be understood that when the fluid is admitted in a direction to drive the piston, $H^1$, in the direction indicated by the arrow in Fig. 10, the fluid will act on the wings of said piston, H', and on the piston, $q^5$, of the clutch, thereby compressing the spring $q^6$, and throwing one prong of the clutch into one of the notches, $q^2$, so as to couple the clutch automatically with the piston, H'. Should the motive fluid circulate through the chamber, $b$, in an opposite direction, the fluid will press against the other side of the piston, $q^5$, and compress the spring, $q^7$, so as to throw the other prong of the clutch, Q, into engagement with one notch of the shaft, B, whereby the clutch operates to couple the piston, H', with the shaft, B. It is to be understood, therefore, that the clutch acts automatically in one direction or the other to make the piston, H', fast with the shaft, B, irrespective of the direction of the circulation of the motive fluid through the chamber, $b$, of the reserve motor.

The principle of my invention is available, also, in the differential gear of automobiles, and in connection with the jack shaft of a chain driven car. In Figs. 12 and 13 there are shown different embodiments of a differential gear contemplated by said invention. The divided rear axle of an automobile is indicated at R, R', and as having the usual driving wheels, $r$, and on said axles are the motors, S, S', adapted to be driven from a pump, T, the piston shaft $t$, of which pump is driven in any suitable way. The pump is connected operatively with the respective motors by a suitable system of piping, and provision is made for reversing the direction of the circulation of the fluid from the pump through the motors and back to said pump, the piping system and the reversing devices being shown diagrammatically in Fig. 12. Said pump, T, is provided with a plurality of pump chambers, $t'$, in which operate the pistons, and from one side of the pump cylinder or casing extends a feed pipe, $t^2$, having a plurality of branches which are connected individually with the respective pump chambers. Said feed pipe, $t^2$, has a cross pipe, $t^8$, which is connected by a plurality of branches, $t^3$, with the chambers of the motors, S, S', and in this cross pipe, $t^8$, are provided reversing valves, $t^4$, $t^5$, which are connected operatively by a rod, $t^6$, adapted to be operated by a lever, $R^2$. A return pipe, $s$, extends from the motors back to the pump, with which pump said pipe, $s$, is connected by a plurality of branches similar to the pipe, $t^2$.

The feed pipe, $t^2$, and the return pipe, $s$, are connected, also, by a cross pipe, $s'$, having a plurality of branches, $s^2$, which are connected with the chambers of the motors in a similar manner to the connection between the cross pipe, $t^8$, by the branches, $t^3$, and in this cross pipe, $s'$, are reversing valves, $s^3$, $s^4$, which are connected by a cross rod, $s^5$, adapted to be moved lengthwise in either direction by a lever, $S^2$.

When driving in a forward direction the valves are adjusted to the position shown in Fig. 12, and the pump operates to force the fluid through the pipes, $t^2$, $t^8$, $t^3$, into the motors, S, S', thereby rotating the latter and the axles. The exhaust from the motors is returned by the pipes, $s^2$, $s'$, $s$, back to the pump. To reverse, the levers $R^2$, $S^2$, are operated in any suitable or convenient way in order to shift the valves, $t^4$, $t^5$, in the pipe, $t^8$, and the valves, $s^3$, $s^4$, in the pipe, $s'$, whereby the fluid passes through the pipes, $t^2$, $s'$, and $s^2$ into the motors in an opposite direction to that first described, the exhaust from said motors being through the pipes, $t^3$, $t^8$, and $s$, back to the pump.

An element of the differential gear consists of one or a plurality of reducing valves, $R^3$, adapted to regulate the circulating fluid for reducing the quantity admitted to one motor while permitting the other motor to receive the full load, whereby one motor and one axle can be driven with more power than the other motor or axle. This is especially useful when one of the driving wheels becomes lodged in a rut of the road, or meets with an obstruction, and in this event the valve or valves, $R^3$, are adjusted in such a way as to reduce the power exerted on the free axle, thus allowing both wheels to turn, but with greater power on the axle of the obstructed wheel.

The system shown in Fig. 13 of the drawings contemplates the employment of single motors, $S^3$, $S^4$, in connection with a variable power pump, T'. Said pump is shown as having a plurality of concentric shafts, $u$, $u'$, $u^2$, each of which is provided with a piston adapted to operate in one of the compartments, $t'$, of said pump. Said shafts are provided with gears, $u^3$, $u^4$, $u^5$, adapted to mesh separately or simultaneously with gears, U, U', on a drive shaft, $U^2$. Said gears, U, U', are on a slidable sleeve, $U^3$, adapted to be operated by a lever, $U^4$, whereby the gear, U, may operate the shaft, $u^2$, by meshing with its gear, $u^3$. It is evident that the sleeve, $U^3$, may be shifted lengthwise of the shaft, $U^2$, for the purpose of making the gear, U, mesh with both gears, $u^3$, $u^4$, and thereby drive the shafts, $u^2$, $u'$, for operating two of the pump pistons; but a further adjustment of the sleeve, $U^3$, brings the gear, U', into mesh with the gear, $u^5$, so that the shaft, $u$, will be operated simultaneously with shafts, $u'$, $u^2$, whereby all of the pistons will be positively rotated. The pipe system and the reversing valves in the differential gear shown in Fig. 13 are somewhat similar to the corresponding parts shown in Fig. 12. The feed pipe, $t^2$, is connected by a plurality of branches with the pump chambers, and the return pipe, $s$, is connected in a similar manner with said pump chambers. Said feed and return pipes are connected by the cross pipes, $t^8$, $s'$, the former being connected by pipes, $t^3$, with the single cylinder motors, $S^3$, $S^4$, and the latter pipe, $s'$, being connected with said motors by the pipes, $s^2$. In the pipe, $t^8$, are reversing valves, $t^4$, $t^5$, adapted to be operated by the lever, $R^2$, while $s'$ contains the reversing valves, $s^3$, $s^4$, which are controllable by the operation of the lever, $S^2$.

The reducing valve, $R^3$, may be used in the system of Fig. 13 for the purpose specified in connection with the system of Fig. 12.

In Figs. 14 and 15 of the drawings I have shown diagrammatically, for the sake of clearness of illustration, the operation of the pump and the motors in connection with the loosely mounted rotatable casing which is provided with the passages forming a liquid circuit between the pump and said motors. The advantage secured by said rotatable casing is, mainly, that the frictional contact of the moving column of liquid, with the walls of the passages in the casing, is reduced to a minimum, whereby I am able to utilize to the best advantage the energy of the liquid.

For propelling driven member, B, in the same direction as driving member, A, reversing valve, J, is opened, as shown in Fig. 14, for the liquid to flow through the passage, $j'$, whereby liquid is supplied to the motor chambers, $a$, $a$, or $a$, $a$ and $b$, in a direction to drive the pistons of motor, G, or motors, G, H, in the same direction as the pump piston, see the arrows in Fig. 14. Now, the moving liquid column impelled by the pump which is operated directly by the engine, the latter running usually at high speed, results in a certain amount of friction between said liquid column and the inner surfaces of the passages and chambers of the casing, C, and, further, the pressure of the moving liquid column against the abutments, E, $G^2$ or E, $G^2$, $H^2$, causes the entire casing, C, to rotate on its longitudinal axis with respect to shafts, A, B, said abutments, E, $G^2$ and $H^2$, (which are mounted in said casing) rotating therewith. The direction of rotation of the casing depends upon various conditions, but with valve, J, adjusted to direct the flow of liquid in the direction shown in Fig. 14, the casing, C, rotates freely with respect to both shafts, A, B.

The automatic brake mechanism, V, shown in Fig. 17, or the manually operated brake mechanism, W, of Fig. 16, or the brake, $L^4$, of Fig. 1, may be operated, however, for the purpose of precluding the rotation of said casing, C, the brake, V, acting automatically to restrain the casing from backward rotation.

Fig. 15 of the drawings shows the mechanism diagrammatically for driving the motor or motors in an opposite direction to that of Fig. 14. It will be recalled from the prior description that pump piston, D, is driven in one direction by the engine, and that the valve, J, is adapted to be operated for changing the direction of flow of the liquid through the chambers, $a$, $a$ and $b$, of the motors, G, H. When it is desired to drive the motor or motors in a reverse direction, to the pump, D, as shown by the arrows in Fig. 15, valve, J, is adjusted to cause the liquid to enter the motor or motors through the passage, $j'$, $i$, and to return to the pump by the passage, $i'$, $j$. The liquid is thus forced by the pump through the motor or motors in an opposite direction to that indicated in Fig. 14, whereby the pistons of the motors, G and H, are driven in the direction indicated by the arrows in Fig. 15. The pressure of the liquid on the abutments, E, $G^2$, $H^2$, of the pump and the motors, and the frictional engagement of the moving liquid column with the inner surfaces of the casing, C, causes said casing, C, to rotate with respect to the pistons of said pump and motors and to shafts, A, B.

It will be understood that the abutment, E, of the pump, and the abutments, $G^2$, $H^2$, of the motors rotate with the casing, and thus the fluid forced by the pump may be said to drive the casing under certain conditions, and said casing in turn drives the motor or motors, the abutments, $G^2$, $H^2$, acting as pistons in forcing the fluid through the chambers, $a$, $a$, $b$, of the motor or motors for the purpose of driving the motor pistons which in turn drive the driven element.

Under some conditions of road service, particularly when the mechanism is adjusted on a reverse drive for propelling an automobile in a backward direction, and at slow speed but with the greatest power, it is possible that the casing, C, for the working parts of the mechanism may have a tendency to turn in an opposite direction to the motor piston. Any suitable means may be employed for overcoming this backward turning of the casing, C, such for example as a band brake. In Fig. 1, however, I have shown a multiple disk brake, $L^4$, of a well known type adapted to be adjusted by the driver for holding the casing C, in a stationary position, whereas, as in Fig. 17, I have shown an automatic arrangement for restraining the casing against backward rotation. Said arrangement of Fig. 17 contemplates the employment of dogs, $v$, mounted on a stationary part, $p^5$, of the frame in such a way that the casing is free to rotate in the same direction as the pump piston, but when the casing has a tendency to turn backwardly the dogs will become wedged in position between said casing and the stationary frame element, $p^5$, thereby locking the casing temporarily against backward movement.

In Fig. 16 of the drawings I have represented a simple embodiment of the invention wherein the driven element, B, is in the form of a sleeve fitted loosely on the driving shaft, A, adapted to extend through said sleeve. The piston of the pump, D, is attached directly to the driving shaft, A, and the pistons of the motors, G, and H, are carried by the driven element, B, in the form of the sleeve, the piston of the motor, G, being fixed to the driven sleeve B, while the piston of the motor, H, is adapted to be made fast with said driven sleeve, B, in either of the ways heretofore described, or in any equivalent manner. Provision is made for coupling the driving and driven elements, A, B, directly together, thereby dispensing with the multiple disk clutches, K, K', in the construction of Fig. 1. A slidable clutch, X, is splined on the driving shaft, A, for movement thereon when the shipper rod, X', is operated. The driven sleeve, B, is provided with a clutch face, $x'$, adapted to be engaged by the face of the clutch, X, whereby the driving and driven elements may be united rigidly and directly when the liquid transmission mechanism gets out of order, and when it is desired that both shafts travel at the same speed. In the construction shown by said Fig. 16, I omit, also, the reversing valve, but I employ the closed liquid circuit and the controlling valve whereby the motor or motors are adapted to be driven by the pump. The transmission mechanism is used in connection with an ordinary reverse gear, and when so used said transmission and reverse mechanisms provide means for propelling an automobile in a backward direction. The multiple disk brake, $L^4$, shown in Fig. 1 operates with the same advantage in connection with the fluid transmission mechanism as the brake, W, in the construction heretofore described and illustrated in Fig. 16.

Having thus fully described my invention, what I claim as new and desire to secure by Letters Patent is:—

1. In an apparatus of the class described, driving and driven members, a casing provided with a liquid circuit, said casing being rotatable relative to said members, means for locking the casing against rotation in either direction, a motor operated by liquid adapted to circulate in said casing, and means for circulating liquid in said casing.

2. In an apparatus of the class described, driving and driven members, a casing rotatable relative to said members, means for restraining said casing against rotation in both directions, a pump operable by the driving member for circulating liquid in said casing, means operated by the circulating liquid in the casing for propelling the driven member, and additional means adapted to also be operated by the circulating liquid and coöperating with said driven member, said additional means supplementing the action of the first named liquid driven means and coöperating therewith to exert increased torque on the driven member.

3. A hydraulic transmission mechanism comprising a single rotatable casing, means for restraining said casing from rotation in either direction, driving and driven members, a pump within the casing and operated by the driving member for circulating liquid through the casing, a plurality of motors within the casing and adapted to coöperate with the driven member, said motors being adapted for operation by the liquid circulating in the casing, and means operable at will for admitting the liquid to one of the motors to the exclusion of the other motor and for admitting liquid simultaneously to both motors.

4. In an apparatus of the class described, driving and driven members in alinement with each other, a liquid circuit, a liquid pump operated by the driving member for forcing a liquid through said circuit, a liquid operated motor adapted to actuate the driven element, another liquid actuated motor adapted to supplement the energy exerted by the first named motor on the driven member, a valve for controlling the supply of liquid to both motors, and a separate valve for reversing the direction of flow of liquid through said motor or motors.

5. In an apparatus of the class described, a driving member, liquid pumping mechanism operated thereby, a motor operated by the liquid from said pumping mechanism, a driven member operated by said motor, a casing rotatable relative to said driving and driven members, means for controlling the rotation of said casing, and means for coupling the driving and driven members for rotation as a unit.

6. In an apparatus of the class described, driving and driven members, a casing rotatable relative to said members, means operated by the driving member for circulating liquid through said casing, a motor coöperating with the driven member and adapted to be operated by the circulating liquid, means for checking the rotation of said casing in both directions, and means for coupling the driving and driven members for unitary rotation.

7. In a liquid transmission mechanism, driving and driven members, a casing rotatable relative to said members, said casing having a liquid circuit, means operated by the driving member for forcing liquid through the circuit, thereby rotating said casing, a plurality of motors within the casing and operable by the liquid circulating therein, and means whereby one of said motors may be coupled to, or uncoupled from, said driven member.

8. In an apparatus of the class described, driving and driven members, a rotatable casing provided with a liquid circuit, means operated by the driving member for forcing liquid through said circuit, a plurality of motors for operating the driven member, one of said motors being fast with said driven member and the other motor being loose with respect to the driven member, and means for bringing the loose motor into coöperative relation to the driven member whereby it is adapted to supplement the action on the driven member of the motor which is fast therewith.

9. In a liquid transmission mechanism, driving and driven members, a casing rotatable relative to said members, said casing having a liquid circuit, means operated by the driving member for forcing liquid through the circuit, thereby rotating said casing, a motor within the casing for operation by the fluid circulating therein, a separate motor also within the casing and loose with respect to the driven member, means for coupling the separate motor to, and disconnecting it from, the driven member, and means for admitting the fluid to one motor to the exclusion of the other motor and for admitting the fluid, also, to both motors practically simultaneously.

10. In an apparatus of the class described, driving and driven members, a liquid circuit, means operated by the driving member for forcing a fluid through said circuit, a plurality of fluid operated motors, and fluid operated means whereby one of said motors is adapted to be connected to the driven member.

11. In a liquid transmission mechanism, driving and driven members, a casing rotatable relative to said members, said casing having a liquid circuit, means operated by the driving member for forcing liquid through the circuit, thereby rotating said casing, a plurality of motors within the casing and operable by the liquid circulating therein, means whereby one of said motors may be coupled to, or uncoupled from, said driven member, and means for restraining the casing from rotation in either direction.

12. In a liquid transmission mechanism, driving and driven members, a casing rotatable relative to said members, means whereby the casing and said members may be coupled for rotation as a unit, a pump within the casing and operable by the driving member for circulating liquid in the casing, a motor also within the casing and operable by the liquid circulating therein, and means for controlling the flow of liquid within the casing.

13. In an apparatus of the class described, driving and driven members, a casing provided with a liquid circuit, means operated by the driving member for forcing liquid through the circuit, a motor operated by the circulating liquid, a valve for controlling said liquid, and means for coupling said members for unitary rotation.

14. In an apparatus of the class described, driving and driven members, a casing provided with a liquid circuit, means operated by the driving member for forcing liquid through the circuit, a plurality of motors adapted to be operated by the circulating liquid and each coöperating with the driven member, a valve for controlling the circulating liquid, and means adapted to secure unitary rotation of said members.

15. In an apparatus of the class described, driving and driven members, a casing provided with a liquid circuit, said casing being rotatable with respect to said members, a pump for circulating liquid in said casing, a motor operated by the circulating liquid, a valve for controlling the circulation of the liquid, means for restraining the casing against rotation, and means for uniting said members for unitary rotation.

16. In an apparatus of the class described, driving and driven members, a casing provided with a liquid circuit, said casing being rotatable with respect to said members, a pump for circulating liquid in said casing, a plurality of motors adapted to be operated by the circulating liquid, a valve for controlling the flow of liquid to one, and also to all, of said motors, and means for securing unitary rotation of said members.

17. In an apparatus of the class described, driving and driven members, a casing provided with a liquid circuit, a pump for circulating liquid in said casing, a motor rotatable with the driven member, a valve for controlling the circulation of liquid, an additional motor loose with respect to the driven member, and means operable by the adjustment of said valve to admit liquid to the additional motor for coupling said additional motor to the driven member.

18. In an apparatus of the class described, driving and driven members, a pump operated by the driving member, a plurality of motors coöperating with the driven element and adapted to be driven by a fluid circulated by said pump, mechanism for reversing the direction of circulation of said motive fluid through the motors, and independent means whereby the motive fluid may be admitted to one of said motors to the exclusion of the other motor and said motive fluid may also be admitted collectively to said motors.

19. In an apparatus of the class described, driving and driven members, a pump operated by the driving member, a plurality of motors adapted to be driven by a fluid circulated by the pump, means whereby the fluid may be admitted to one motor to the exclusion of the other motor and said motive fluid may, also, be admitted collectively to said motors, and a reversing valve in the path of the fluid for reversing the direction of circulation of such fluid through said motors.

20. In an apparatus of the class described, driving and driven members, a circulating pump, a plurality of fluid-operated motors, a fluid circuit intermediate said pump and the motors, independent valves in said circuit, one of said valves regulating the admission of fluid to the individual motors, and the other valve directing the fluid in one direction or the other through the motors.

21. In an apparatus of the class described, driving and driven members, a circulating pump, a plurality of fluid-operated motors, each adapted to coöperate with the driven member, a fluid circuit intermediate said pump and the motors, and independent valve mechanisms in said circuit, one of said valve mechanisms controlling the admission of fluid to the individual motors, and the other valve mechanism directing the fluid in one direction or the other through said motors.

22. In an apparatus of the class described, driving and driven members, a casing rotatable relative to said members, a circulating pump, a plurality of motors, a fluid circuit intermediate the pump and said motors, valve mechanism whereby the fluid may be admitted to one or more of said motors, and means for securing unitary rotation of said members.

23. In an apparatus of the class described, driving and driven members, a casing rotatable relative to said members, a liquid circulating pump, a plurality of motors coöperating with the driven member, valve mechanism for controlling the flow of liquid through said motors, and means for securing unitary rotation of said members.

24. In an apparatus of the class described, driving and driven members, a casing rotatable relative to said members, fluid operated means for driving one member by the other member, and means for restraining the casing against rotation in both directions.

25. In an apparatus of the class described, driving and driven members, a casing rotatable relative to said members, fluid operated means for driving one member by the other member, means for coupling the members for unitary rotation, and means for restraining the casing from rotation.

26. In an apparatus of the class described, driving and driven members, a casing rotatable relative to said members, fluid operated means for driving one member by the other member, means for coupling the members for unitary rotation, means for controlling the circulation of liquid within the casing, and means for restraining the casing against rotation.

27. In an apparatus of the class described, driving and driven members, a casing rotatable with respect to said members, means within the casing for operating one member with increased power from the other member, and mechanism whereby said members may be coupled through the medium of said casing for rotation as a unit.

28. In an apparatus of the class described, driving and driven shafts, a casing rotatable with respect to said shafts, clutches whereby the shafts may be made fast with the casing for coupling said parts for rotation as a unit, and fluid-operated means within the casing and adapted to drive one member from the other member.

29. In an apparatus of the class described, driving and driven members, a casing rotatable with respect to said members, means whereby said members may be adapted for rotation as a unit, fluid operated means for driving one member from the other member, and controlling means for said fluid-operated means.

30. In an apparatus of the class described, driving and driven members, a casing rotatable with respect to said members, fluid-operated means adapted to drive one member by the circulation of fluid impelled by the other member when the casing is free to rotate, means for controlling the circulation of such fluid, and means whereby the driving and driven members are adapted for rotation as a unit.

31. In an apparatus of the class described, driving and driven members, a casing rotatable with respect to said members, means for coupling said members directly to one another for rotation as a unit, and fluid operated mechanism within said casing for driving one member from the other member.

32. In an apparatus of the class described, driving and driven members, a casing rotatable with respect to said members, a clutch for directly coupling said members for rotation as a unit, means operable at will for adjusting said clutch, fluid-operated means for driving one member by the other by the circulation of a fluid, and means adapted to control or regulate the fluid circulation.

33. In an apparatus of the class described, driving and driven members, a rotatable casing, means operable by the rotation of the casing in one direction for locking it, manually operable means for restraining the casing from rotation in either direction, and fluid operated mechanism for driving one member by the operation of the other member.

34. In an apparatus of the class described, driving and driven members, a casing rotatable with respect to said members, means for locking said casing against rotation in both directions, and fluid-operated means for driving one member by the other member.

35. In an apparatus of the class described, driving and driven members, a casing rotatable with respect to said members, two sets of devices for locking said casing, one set of devices operating to hold the casing against rotation in either direction, and the other set of devices operating automatically to restrain the casing against rotation in one direction, and fluid operated means for driving one member by the other member.

36. In an apparatus of the class described, driving and driven members, a rotatable casing, a pump, a motor, a fluid circuit between the pump and the motor, and means for holding the casing against rotation in both directions, whereby one member is adapted to force a liquid through the circuit and thereby utilize the resistance of such liquid as a braking medium.

37. In an apparatus of the class described, driving and driven members, a rotatable casing, a pump, a motor, a fluid circuit between the pump and the motor, means for holding the casing against rotation in both directions, whereby a driven member is adapted to force a liquid through the circuit and thereby utilize the resistance of such liquid as a brake, and means operated at will for controlling the circulation of liquid through said circuit, whereby the resistance of the liquid may be varied.

38. In an apparatus of the class described, driving and driven members, a rotatable casing, a pump, a motor, a fluid circuit between said pump and motor, whereby the motor is adapted normally to be driven by the circulation of fluid impelled by the pump, and means for locking the casing against rotation in both directions while permitting the driven member to rotate freely, whereby the fluid may oppose resistance to the rotation of the driven member.

39. In an apparatus of the class described, driving and driven members, a rotatable casing, a pump, a motor, a fluid circuit between said pump and motor, whereby the motor is adapted normally to be driven by the circulation of fluid impelled by the pump, means for locking the casing against rotation while permitting the driven member to rotate freely, whereby the fluid may oppose resistance to the rotation of the driven member, and means for controlling the circulation of fluid in either direction through said liquid circuit.

40. In an apparatus of the class described, driving and driven members, a rotatable casing, fluid operated means within the casing for normally driving one member by the circulation of fluid impelled by the other member, means for controlling the circulation of the fluid, and means for restraining the casing against rotation in both directions while permitting the driven member to rotate, whereby the fluid may oppose variable resistance to the rotation of the driven member.

41. In an apparatus of the class described, driving and driven members, a rotatable casing, fluid operated means for driving the driven member by the agency of a circulating fluid impelled by the driving member, means for controlling the circulation of such fluid, and means for locking the casing against rotation in both directions while permitting free rotation of the driven member.

42. In an apparatus of the class described, driving and driven members, a pump, a motor normally free from the driven member, a rotatable casing provided with a fluid circuit, means for locking said casing from rotation in either direction, and means for rotating the driven member from the motor.

43. In an apparatus of the class described, driving and driven members, a pump, a motor normally free from the driven member, a fluid circuit, and fluid operated means adapted to make the motor impel the driven member.

44. In an apparatus of the class described, driving and driven members, a pump, a motor normally free from the driven member, a fluid circuit, and a double acting clutch mechanism operated by pressure of fluid circulating in either direction for coupling the motor to the driven member.

45. In an apparatus of the class described, driving and driven members, a pump, a motor normally free from the driven member, a rotatable casing provided with a fluid circuit, means for locking said casing from rotation in either direction, means for controlling the circulation of fluid in said circuit, and means for coupling said motor with the driven member.

46. In an apparatus of the class described, driving and driven members, a pump operated by said driving member, a motor loose with respect to said driven member, a casing inclosing said pump and the motor and rotatable relative to said driving and driven members, means for restraining the casing from rotation in either direction, means for clutching the motor fast with said driven member, and a valve for controlling the flow of liquid between the pump and the motor.

47. In an apparatus of the class described, driving and driven members, a pump operated by said driving member, a motor loose with respect to said driven member, a valve for controlling the circulation of liquid between the pump and motor, and means operated by the adjustment of the valve for coupling said motor to the driven member.

48. In an apparatus of the class described, driving and driven members, a pump operated by said driving member, a motor loose with respect to said driven member, a casing rotatable with respect to the driving and driven members, means for controlling the rotation of said casing, a valve for controlling the flow of liquid between the pump and motor, and means for coupling the motor to the driven member.

49. In an apparatus of the class described, driving and driven members, a rotatable casing, fluid-operated transmission mechanism for rotating one member with variable power and speed from the other member, means for coupling said members for rotation as a unit, and means for regulating the circulation of said fluid.

50. In an apparatus of the class described, driving and driven members, a liquid circulating pump coöperating with one of said members, a liquid operated motor coöperating with the other of said members, a casing driven by liquid impelled by the pump, which casing drives the said motor by forcing liquid therethrough, means for controlling the circulation of such liquid, and means for restraining the casing from rotation in both directions.

51. In a liquid operated power transmission apparatus, driving and driven members, a casing rotatable with respect to said members, means for restraining the casing from rotation in both directions, a liquid circuit in said casing, liquid actuated means whereby one of said members is operated from the other member, and means for controlling the circulation of liquid whereby said casing may be locked relative to said members for rotation therewith.

52. In a liquid operated power transmission apparatus, driving and driven members, a casing rotatable with respect to said members, means for restraining the casing from rotation in both directions, a liquid circuit in said casing, a plurality of devices in coöperative relation to said liquid circuit and also coöperating with the driven and driving members, respectively, whereby power from one of said devices is transmitted by liquid in said circuit for operating the other of said devices, and means for controlling the circulation of liquid whereby said casing may be locked relative to said members for rotation therewith.

53. In a liquid operated power transmission apparatus, driving and driven members, a casing adapted for rotation with respect to said members, means for restraining the casing from rotation in both directions, a liquid circuit in said casing, means operated by the driving member for circulating liquid through said circuit, means coöperating with the driven member and operated by the circulation of said liquid, and means for regulating the flow of liquid through said circuit whereby said casing may be gradually locked to said driving and driven members.

54. In a liquid operated power transmission apparatus, driving and driven members, a rotatable casing, means for locking said casing against rotation in both directions, a liquid circuit in said casing, means operated by the driving member for circulating liquid in said circuit, means actuated by the liquid for operating the driving member, and means for controlling the circulation of the liquid in the circuit.

55. A hydraulic transmission mechanism comprising a rotatable part, a hydraulic pump and a reversible hydraulic motor carried thereby, means for controlling the flow of liquid between said pump and said motor to vary the speed of said motor and means for holding said part against movement in the direction of rotation of said pump to reverse said motor, substantially as described.

56. A hydraulic transmission mechanism comprising a rotatable part, a hydraulic pump and a reversible hydraulic motor carried thereby, valve mechanism for controlling, regulating and cutting off the flow of liquid between said pump and said motor and a brake for checking the movement of said part in the direction of rotation of said pump.

57. A hydraulic transmission mechanism comprising a rotatable part, a hydraulic pump and a reversible hydraulic motor carried thereby, said part having passages connecting the inlet and discharge ports of said pump and motor, a valve mounted on said rotatable part for regulating and cutting off the flow of liquid through said passages and a brake for holding said part against movement in the direction of rotation of said pump to thereby reverse said motor, substantially as described.

58. A hydraulic transmission member comprising a hydraulic pump and a reversible hydraulic motor provided with communicating inlets and discharge passages, the casings of said pump and motor being connected together and rotatable, means for regulating the flow of liquid through said passages to vary the speed of said motor and means for checking the rotation of said pump and motor casings, in the direction of rotation of said pump to thereby reverse said motor, substantially as described.

59. A hydraulic transmission member comprising a hydraulic pump and a reversible hydraulic motor provided with communicating inlet and discharge passages, the casings of said pump and motor being connected together and rotatable, a valve mounted to rotate with said pump and motor casings for regulating and cutting off the flow of liquid through said passages and a brake for holding said pump and motor casings against revolution in the direction of rotation of said pump, substantially as described.

60. A hydraulic transmission mechanism comprising a rotary hydraulic pump and a reversible rotary hydraulic motor having a common axis of rotation and communicating inlet and discharge passages, the casings of said pump and motor being connected together and rotatable about the common axis, means for regulating the flow of liquid through said passages to vary the speed of said motor and means for holding said pump and motor casings against movement in the direction of rotation of said pump to thereby reverse said motor, substantially as described.

61. A hydraulic transmission mechanism comprising a rotary hydraulic pump and a reversible rotary hydraulic motor having a common axis of rotation and communicating inlet and discharge passages, the casings of said pump and motor being connected together and rotatable about the common axis, a valve rotatable with said pump and motor casings for regulating and cutting off the flow of liquid through said passages, a non-rotatable shifter connected to said valve, and a brake for holding said pump and motor casings against revolution in either direction, substantially as described.

62. The combination with rotatable driving and driven members having a common axis of rotation, of a part intermediate said members rotatable about the common axis, a hydraulic pump and a single reversible hydraulic motor carried by said part and connected respectively to said driving and driven members, means for controlling the flow of liquid between said pump and motor to vary the speed of said motor and means for holding said part against rotation in the direction of rotation of said pump to thereby reverse said motor, substantially as described.

63. The combination with driving and driven shafts arranged in line, of a hydraulic pump and a single reversible hydraulic motor having communicating inlet and discharge ports and connected respectively to said driving and said driven shafts, the casings of said pump and said motor being connected together and rotatable about the axis of said shafts, valve mechanism for regulating and cutting off the flow of liquid between said pump and said motor and a brake for holding said pump and motor casings against rotation, in the direction of rotation of said pump, substantially as described.

64. The combination with rotatable driving and driven members having a common axis of rotation, of a part intermediate said members rotatable about the common axis, a hydraulic pump and a single reversible hydraulic motor carried by said part and connected respectively to said driving and said driven member, said part having passages communicating with the inlet and discharge ports of said pump and motor, a valve mounted on said part for regulating and cutting off the flow of liquid through said passages, a non-rotatable lever, operating connections between said lever and said valve and a brake for checking the rotation of said part in either direction, substantially as described.

65. The combination with driving and driven members rotatable about a common axis, of a rotary hydraulic pump and a reversible rotary hydraulic motor having communicating inlet and exhaust ports and connected respectively to said driving and said driven members, the casings of said pump and motor being connected together and rotatable about the axis of said driving and driven members, means for controlling the flow of liquid between said pump and said motor, and means for checking the rotation of said pump and motor casings in the direction of rotation of said pump to thereby reverse said motor.

66. The combination with driving and driven shafts arranged in line, of a rotary hydraulic pump and a reversible rotary hydraulic motor having communicating inlet and exhaust ports and connected respectively to said driving and said driven shafts, the casings of said pump and motor being connected together and rotatable about the axis of said driving and driven shafts, a valve rotatable with said pump and motor casings for regulating and cutting off the flow of liquid between said pump and said motor to vary the speed of said motor and a brake for holding said pump and motor casings against revolution in either direction to thereby reverse said motor, substantially as described.

67. In an apparatus of the class described, the combination with driving and driven members, of a casing rotatable relative to said members, fluid operated means for driving one member by the other member, and means for restraining the casing from rotation in either direction.

68. In an apparatus of the class described, the combination with driving and driven members, of a casing rotatable relative to said members, pumping mechanism for forcing liquid through said casing, a motor operable by the motion of said liquid, means positioned intermediate the pumping mechanism and the motor for reversing the direction of flow of the liquid, and means for controlling the rotation of said casing.

69. In an apparatus of the class described, the combination with driving and driven members, of a casing rotatable relative to said members, pumping mechanism for forcing liquid through said casing, a motor operable by the motion of said liquid, means positioned between the pumping mechanism and the motor whereby the flow of liquid is regulated and controlled to result in rotation of the motor and casing gradually on the admission of the liquid, and means for controlling the rotation of the casing in either direction.

70. In an apparatus of the class described, the combination with driving and driven members, and a casing rotatable with reference thereto, of a pump rotated constantly in one direction by the action thereon of the driving member, a motor coöperating with the driven member, means whereby the direction of flow of the liquid forced by the pump may be changed so as to reverse the direction of the motor and the driven member, and means for controlling the rotation of the casing in either direction.

71. In an apparatus of the class described, the combination with driving and driven members, and a casing rotatable with reference thereto, of a pump rotated constantly in one direction by the action thereon of the driving member, means whereby liquid forced by the pump may circulate between the intake and outlet of said pump, a motor adapted to be operated by said liquid, means for controlling the flow of liquid between the pump and the motor, and means for controlling the rotation of said casing in either direction.

72. In an apparatus of the class described, the combination of driving and driven members, a casing rotatable relative to said members, a pump coöperating with one member, a motor coöperating with the other member, and means separate from the motor and the pump for coupling said members for unitary rotation.

73. In an apparatus of the class described, the combination of a rotatable part, a hydraulic pump, a reversible hydraulic motor, said pump and said motor being carried by said rotatable part, means for controlling the flow of liquid between said pump and said motor, means for controlling the rotation in either direction of said rotatable part, and separate means for reversing the direction of flow of the liquid between the pump and the motor.

74. In an apparatus of the class described, the combination with rotatable driving and driven members having a common axis of rotation, of a part intermediate said members and rotatable about the common axis, a hydraulic pump connected with the driving member, a plurality of reversible hydraulic motors adapted to be operatively connected with the driven member, means for controlling the flow of liquid between said pump and the motors, to vary the torque on the driven member, and means for controlling and checking the rotation in either direction of said rotatable part.

In testimony whereof I have signed my name to this specification in the presence of two subscribing witnesses.

CHARLES SNOW KELLOGG.

Witnesses:
H. I. BERNHARD,
JAS. H. GRIFFIN.